US011503874B2

(12) United States Patent
O'Malley

(10) Patent No.: US 11,503,874 B2
(45) Date of Patent: Nov. 22, 2022

(54) AERODYNAMIC PROJECTION PORTION FOR CYCLING SHOE

(71) Applicant: Edward O'Malley, Boulder, CO (US)

(72) Inventor: Edward O'Malley, Boulder, CO (US)

(*) Notice: Subject to any disclaimer, the term of this patent is extended or adjusted under 35 U.S.C. 154(b) by 71 days.

(21) Appl. No.: 17/058,704

(22) PCT Filed: May 30, 2019

(86) PCT No.: PCT/US2019/034506
§ 371 (c)(1),
(2) Date: Nov. 25, 2020

(87) PCT Pub. No.: WO2019/232121
PCT Pub. Date: Dec. 5, 2019

(65) Prior Publication Data

US 2021/0204641 A1 Jul. 8, 2021

Related U.S. Application Data

(60) Provisional application No. 62/783,710, filed on Dec. 21, 2018, provisional application No. 62/678,559, filed on May 31, 2018.

(51) Int. Cl.
*A43B 5/14* (2006.01)
*A43B 3/24* (2006.01)

(52) U.S. Cl.
CPC . *A43B 5/14* (2013.01); *A43B 3/24* (2013.01)

(58) Field of Classification Search
CPC ........................................................ A43B 5/14
USPC ........................................................... 36/131
See application file for complete search history.

(56) References Cited

U.S. PATENT DOCUMENTS 4,825,565 A * 5/1989 Bigolin .................... A43B 5/14 36/131
5,363,573 A * 11/1994 Kilgore .................... A43B 5/14 36/131
5,746,016 A 5/1998 Freisinger et al.
5,836,094 A * 11/1998 Figel .................... A43B 13/026 36/131
6,260,291 B1 * 7/2001 Farys ....................... A43B 5/14 36/108
9,596,906 B2 * 3/2017 Lee ...................... A43B 13/145
9,609,905 B1 * 4/2017 Leko .................... A43B 13/122
10,279,862 B2 * 5/2019 Bryne .................... B62M 3/086

(Continued)

FOREIGN PATENT DOCUMENTS

WO WO1999047013 9/1999

OTHER PUBLICATIONS

International Search Report and Written Opinion for PCT/US19/34496 dated Aug. 9, 2019.

(Continued)

*Primary Examiner* — Marie D Bays
(74) *Attorney, Agent, or Firm* — Sheehan Phinney Bass & Green PA

(57) ABSTRACT

A cycling shoe having a sole and an upper coupled to the sole. A projection portion extends off a bottom surface of the sole behind a cleat (attachment) portion of the sole. The projection portion has a first lateral side surface, a second lateral side surface an opposite side of the cycling shoe from the first lateral side surface, a bottom surface, and rounded lateral edges that connect each of the first and second lateral side surfaces to the bottom surface.

13 Claims, 17 Drawing Sheets

(56) References Cited

U.S. PATENT DOCUMENTS

| | | | | |
|---|---|---|---|---|
| 10,800,483 | B2 * | 10/2020 | Chen | A43B 5/14 |
| 2010/0301632 | A1 | 12/2010 | Bryne | |
| 2011/0056095 | A1 | 3/2011 | Torrance | |
| 2011/0314701 | A1 | 12/2011 | Rod et al. | |
| 2013/0086816 | A1 | 4/2013 | Johnson et al. | |
| 2016/0302530 | A1 | 10/2016 | Smith et al. | |
| 2016/0331068 | A1 * | 11/2016 | Bigolin | A43B 7/085 |

OTHER PUBLICATIONS

International Search Report and Written Opinion for PCT/US19/34506 dated Aug. 16, 2019.

* cited by examiner

WHEN THE BUCKLE IS ROTATED TO THE OPEN POSITION, THE CABLES ARE LOOSENED SUCH THAT THE CLOSURE PANEL CAN BE LIFTED AWAY FROM THE SHOE. THIS ALLOWS THE FOOT TO BE EASILY INSERTED OR REMOVED FROM THE SHOE.

M
108
100
A
A
A
102
930
932

21.97 +25 −8
124a
124f
M
124e
A
102
124g
124b
930
SECTION A–A
SCALE 1:1

AERODYNAMIC PROJECTION PORTION FOR CYCLING SHOE

CROSS-REFERENCE TO RELATED APPLICATIONS

This application claims the benefit of priority to U.S. Provisional Patent Application No. 62/678,559, entitled AERODYNAMIC PROJECTION PORTION FOR CYCLING SHOE, which was filed on May 31, 2018, and to U.S. Provisional Patent Application No. 62/783,710, entitled AERODYNAMIC PROJECTION PORTION FOR CYCLING SHOE, filed Dec. 21, 2018, the disclosures of which are incorporated by reference herein in their entireties.

FIELD OF THE INVENTION

This disclosure relates to a cycling shoe and, more particularly, relates to a projection portion that extends off of a rear portion of the sole of a cycling shoe for improved aerodynamics.

BACKGROUND

A multisport competition, such as triathlon (or duathlon), is one in which an athlete races in a continuous series of stages in different racing disciplines, such as swimming, cycling, running, and transitions between the different disciplines. It is important for such athletes to not only perform at a high level in each discipline of a particular race, but also to gain any advantage possible including, for example, aerodynamic advantages.

SUMMARY OF THE INVENTION

A cycling shoe is disclosed herein that, in a typical implementation, is not only highly aerodynamic, but also one that is easy to put on and take off quickly, which can facilitate very quick transitions in multisport competition, for example.

In one aspect, a cycling shoe has a sole and an upper coupled to the sole. A projection portion extends off a bottom surface of the sole behind a cleat (attachment) portion of the sole. The projection portion has a first lateral side surface, a second lateral side surface at an opposite side of the cycling shoe from the first lateral side surface, a bottom surface, and rounded lateral edges that connect each of the first and second lateral side surfaces to the bottom surface.

In a typical implementation, each of the rounded lateral edges has a radius of at least 7 mm.

The cycling shoe typically has a means for attaching a cycling cleat to sole in the cleat portion of the sole, and, in some implementations, a cycling cleat attached to the cleat portion of the sole. In some such implementations, the projection portion has a front side surface that faces the cycling cleat, and there is a space between the front surface of the projection portion and the cycling cleat.

In some implementations, the projection portion has one or more passages through it to accommodate one or more cables for connecting a lever assembly to an adjustable closure panel on the shoe. The lever assembly can be configured, as described elsewhere herein, such that moving the lever assembly between the first position and the second position causes the one or more cables, if connected between the lever assembly to the adjustable closure panel, to tighten or loosen the closure panel relative to the upper.

In a typical implementation, each lateral side surface of the projection portion extends from a bottom surface of the sole flush with or very close to flush with a corresponding lateral side surface of the sole. Moreover, in a typical implementation, each lateral side surface of the sole is flush with or very close to flush with a corresponding lateral side surface of the upper.

The projection portion, in some implementations, has a rear surface that slopes upward from the bottom surface of the projection portion to a rear of the sole or upper. Moreover, the rear surface of the projection portion typically is flush with or very close to flush with a corresponding rear surface of the sole and/or upper.

In some implementations, the projection portion is configured such that a furthest point of a trailing edge of the shoe, which is part of the projection portion, in a 55-degree toe-down position is between 14 millimeters and 47 millimeters from the sole, or from where the sole would be if the projection portion were not present. In some implementations, the furthest point of the trailing edge of the shoe in a 55-degree toe-down position is between 17 millimeters and 37 millimeters from the sole, or from where the sole would be if the projection portion were not present. In one particular example, at 55 degrees toe-down, the furthest point of the trailing edge of the shoe (e.g., the bottom of the projection portion) may be 19.9 millimeters (+/−10%) past the sole in the direction of the apparent wind.

In another aspect, a cycling shoe has a sole and an upper attached to the sole. An adjustable closure panel extends across an opening in the upper. A lever assembly is exposed at an outer, rear surface of the upper, and is movable about a hinge between a first position and a second position. One or more passages extend through the cycling shoe to accommodate one or more cables to connect the lever assembly to the adjustable closure panel. The lever assembly is configured such that moving the lever assembly between the first position and the second position causes the one or more cables, if connected between the lever assembly to the adjustable closure panel, to tighten or loosen the closure panel relative to the upper.

In a typical implementation, loosening the one or more cables that connect the lever to the adjustable closure panel facilitates lifting the closure panel away from the upper so that a foot can be inserted or removed from the cycling shoe with ease.

In some implementations, the lever assembly is configured such that: in the first position, the lever assembly substantially conforms to a contour of the rear surface of the upper, and in the second position, the lever assembly extends away from the upper in a rearward direction from the rear surface of the upper.

According to certain implementations, each of the one or more cables extends through a projection portion of the sole of the cycling shoe, or some other portion of the sole of the cycling shoe between the lever assembly and the adjustable closure panel. Moreover, each of the one or more cables may extend from the lever assembly, into a rear hole in a rear portion of the sole, through the sole, to a forward hole in a side surface of the sole, and to the closure panel.

In a typical implementation, there are one or more cable connectors attached to the closure panel, where each cable connector facilitates connecting the one or more cables to the closure panel.

In some implementations, the lever assembly has a cable carriage for coupling the one or more cables to the lever assembly. The cable carriage may define one or more openings, or anchors, through which the one or more cables can pass or to which the one or more cables can be attached when coupled to the lever assembly. In some such implementations, the cable carriage may include a guide (e.g., a track or recess) that extends along the lever assembly between a proximal part of the lever assembly and a distal part of the lever assembly. The cable carriage may be coupled to and movable along the guide (e.g., track or recess) between a portion of the guide closer to the proximal part of the lever assembly and a portion of the guide closer to the distal part of the lever assembly.

According to certain implementations, the lever assembly further includes a tension adjuster for adjusting a position of the cable carriage along the guide (e.g., track or recess). In some implementations, the tension adjuster includes a knob and a threaded rod, which may be supported by a bracket portion of the lever assembly, for example, in a manner that permits the tension adjuster to be rotated about an axis but prevents the adjuster from being moved in an axial direction along the axis.

In some implementations, the cable carriage has surfaces that define a threaded hole through the cable carriage, and the threaded rod of the tension adjuster passes through, and engages, the threaded hole of the cable carriage.

One or more cables may connect the lever assembly to the adjustable closure panel.

The one or more cables may include one, and only one, cable. In some implementations, the one, and only one, cable extends from a first cable connector at a first lateral edge of the closure panel, through a first one of the passages, through a first cable hole in the cable carriage, through a second cable hole in the cable carriage, through a second one of the passages, and to a second cable connector at a second lateral edge of the closure panel, opposite the first lateral edge of the closure panel.

The one or more cables may include a first cable and a second cable. In some implementations, the first cable extends from a first cable connector at a first lateral edge of the closure panel, through a first one of the passages, and to the cable carriage, and the second cable extends from a second cable connector at a second lateral edge of the closure panel opposite the first lateral edge of the closure panel, through a second one of the passages, and to the cable carriage.

In some implementations, the hinge has a first portion that connects a first part of the lever assembly to a first lateral portion of the upper (e.g., via an extension coupled to the upper); and a second portion that connects a second part of the lever assembly to a second lateral portion of the upper (e.g., via the extension). The first portion of the hinge is separated from the second portion of the hinge by a space, and the cycling shoe is configured such that the one or more cables pass through the space when lever assembly moves between the first position and the second position.

Certain implementations include a strip of material attached to a side surface of the cycling shoe and that extends to the opening in the upper. The strip of material has sufficient stiffness and is placed in such a way that it will hold the opening in the upper in a more open position and in contact with the closure panel, making an opening in the cycling shoe for a foot larger than it otherwise might be.

In another aspect, a cycling shoe includes a sole and an upper attached to the sole. An adjustable closure panel extends across an opening in the upper. A lever assembly is exposed at an outer, rear surface of the upper. The lever assembly is movable about a hinge between a first position and a second position. One or more passages extend through a sole (or projection portion of the sole) of the cycling shoe. One or more cables extend through the one or more passages and connect the lever assembly to the adjustable closure panel. In some implementations, a strip of material is attached to a side surface of the cycling shoe and extends to the opening of the upper. The lever assembly is configured such that moving the lever assembly between the first position and the second position causes the one or more cables to tighten or loosen the closure panel relative to the upper.

In some implementations, one or more of the following advantages are present.

A cycling shoe is disclosed that is both highly aerodynamic (particularly in a toe-down configuration) and easy to put on and take off quickly. This makes the cycling shoe particularly well suited for use in multisport events, such as triathlon or duathlon, where both aerodynamics while riding and quick transition times between race segments (e.g., from swimming to cycling, from cycling to running, from running to cycling, etc.) are highly desirable. The shoe is extremely easy to loosen and tighten—switching from an open (or loose) configuration (where the shoe can be put on or taken off easily) to a closed (or tight) configuration (where the shoe is tightly secured onto a cyclist's foot), with one simple movement—like the flip of a switch.

Other features and advantages will be apparent from the description and drawings, and from the claims.

BRIEF DESCRIPTION OF THE DRAWINGS

Like reference characters refer to like elements.

DETAILED DESCRIPTION

Figure 1:
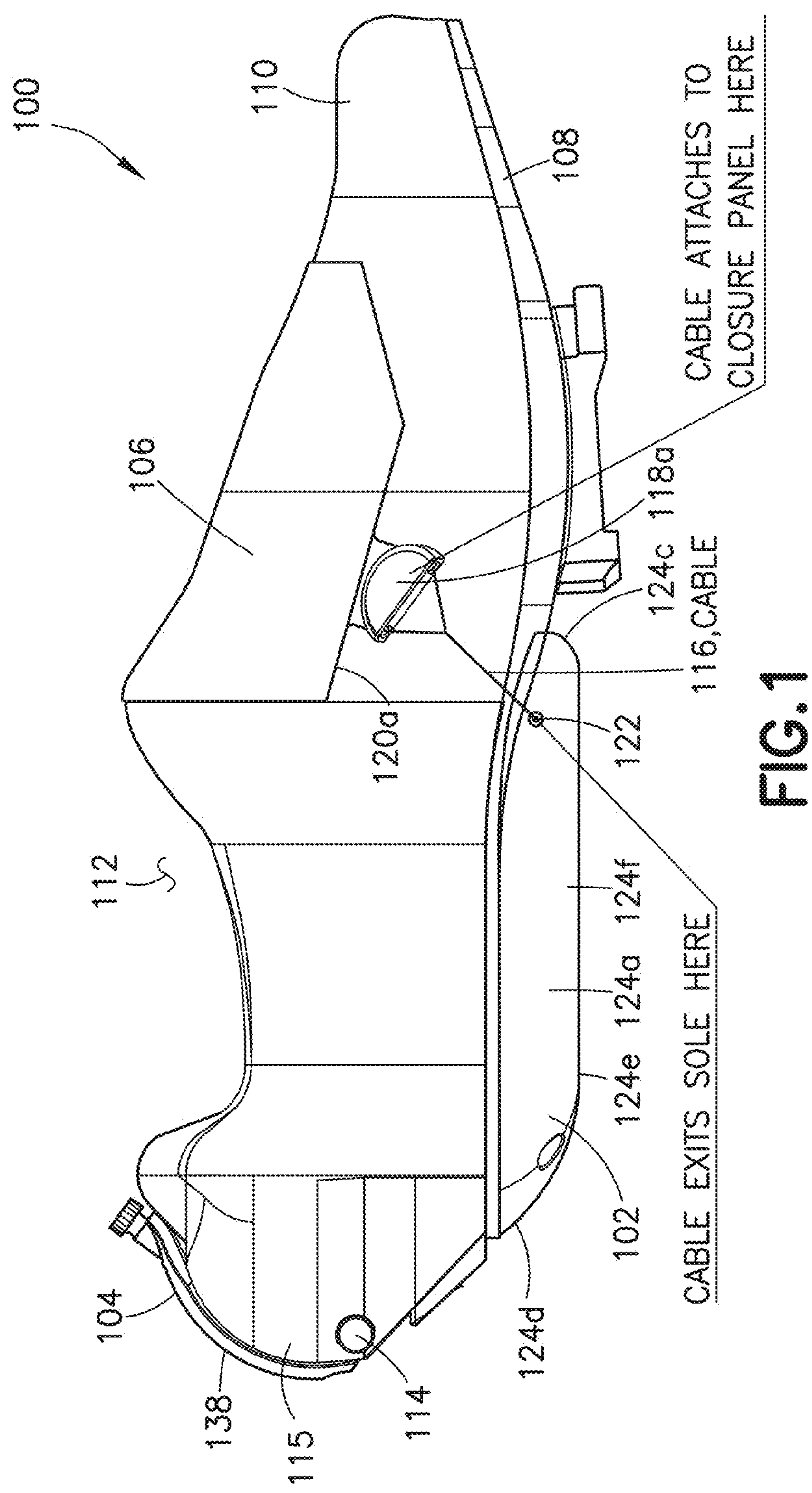
FIG. 1 is a right side view of an exemplary implementation of a cycling shoe.

FIGS. 1-4 show an exemplary implementation of a cycling shoe 100 that is highly aerodynamic and easy to put on and take off quickly. This makes the cycling shoe 100 particularly well suited for use in multisport events, such as triathlon or duathlon, where both aerodynamics while riding and quick transition times between race segments (e.g., from swimming to cycling, from cycling to running, from running to cycling, etc.) are highly desirable.

In various implementations, the cycling shoe 100 may include one or more of a variety of features that contribute to its aerodynamic nature. For example, in the illustrated implementation, the overall shape of the cycling shoe 100, including a projection portion 102 on the bottom of the cycling shoe 100, contributes to the shoe's overall aerodynamic nature. As another example, in the illustrated implementation, the location of the lever assembly 104 (the manipulation of which activates the shoe's closure mechanism) at the rear of the cycling shoe 100 behind the heel contributes to the shoe's overall aerodynamic nature. Either of these features alone can have a positive impact on the shoe's overall aerodynamic nature. In implementations that include both of these features, the positive impact on the shoe's aerodynamic nature is even greater.

In various implementations, the cycling shoe 100 may include one or more of a variety of features that help make the shoe easy to put on and take off quickly. For example, in the illustrated implementation, the shoe has a closure mechanism that is very easy to use. Indeed, the shoe closure mechanism in the illustrated implementation can be closed or opened with one simple movement (e.g., by moving the lever assembly 104 at the rear part of the cycling shoe between its position shown in FIGS. 1-3 (shoe closed) and its position shown in FIG. 4 (shoe open)—like the flip of a switch). As another example, in the illustrated implementation, the cycling shoe 100 may be fitted with one or more strips of semi-rigid, but flexible material (not shown in FIGS. 1A and 1B, but see 550 in FIGS. 5-7) configured to urge the upper 110 open (as in FIG. 4), the closure panel 106 is pushed away from the upper 110, making the opening 112 for the foot large. This enables the cyclist to easily slip his or her foot inside the shoe when the shoe is open. Either of these features alone can have a positive impact on the shoe's ease of use. In implementations that include both of these features, the positive impact on the shoe's ease of use is even greater.

These various features are described in detail herein. In various implementations, a cycling shoe may be provided that includes one or more (any combination of), or all, of these features.

Focusing again on FIGS. 1-4, the illustrated cycling shoe 100 has a sole 108 and an upper 110 attached to the sole 108. An adjustable closure panel 106 extends across an opening in a top portion of the upper 110. Collectively, the sole 108, the upper 110, and the closure panel 106 define an interior foot compartment for receiving the foot of a cyclist. The upper 110 and the closure panel 106 also collectively define an opening 112 for a foot in the top portion of the cycling shoe 100 into the foot compartment. During use, a cyclist can slide his or her foot through the opening 112 and into the foot compartment to put the shoe on.

The closure panel 106 is adjustable by virtue of the fact that at least part of the closure panel 106 is movable with respect to the upper 110 to increase or decrease the size of the opening 112 into the foot compartment. In some implementations, a portion of the closure panel 106 (e.g., the front end, or the front end and one or more of the sides) may be physically attached (e.g., with stitching, adhesive, or the like) to the upper 110, but the portion of the closure panel 106 at and/or near the edge of the opening 112 is not connected to the upper 110, but instead, is free to move away from or closer to the upper 110, at least somewhat, unless restrained, for example, by the shoe's closure mechanism when the shoe is closed (as in FIGS. 1-3).

Figure 3:
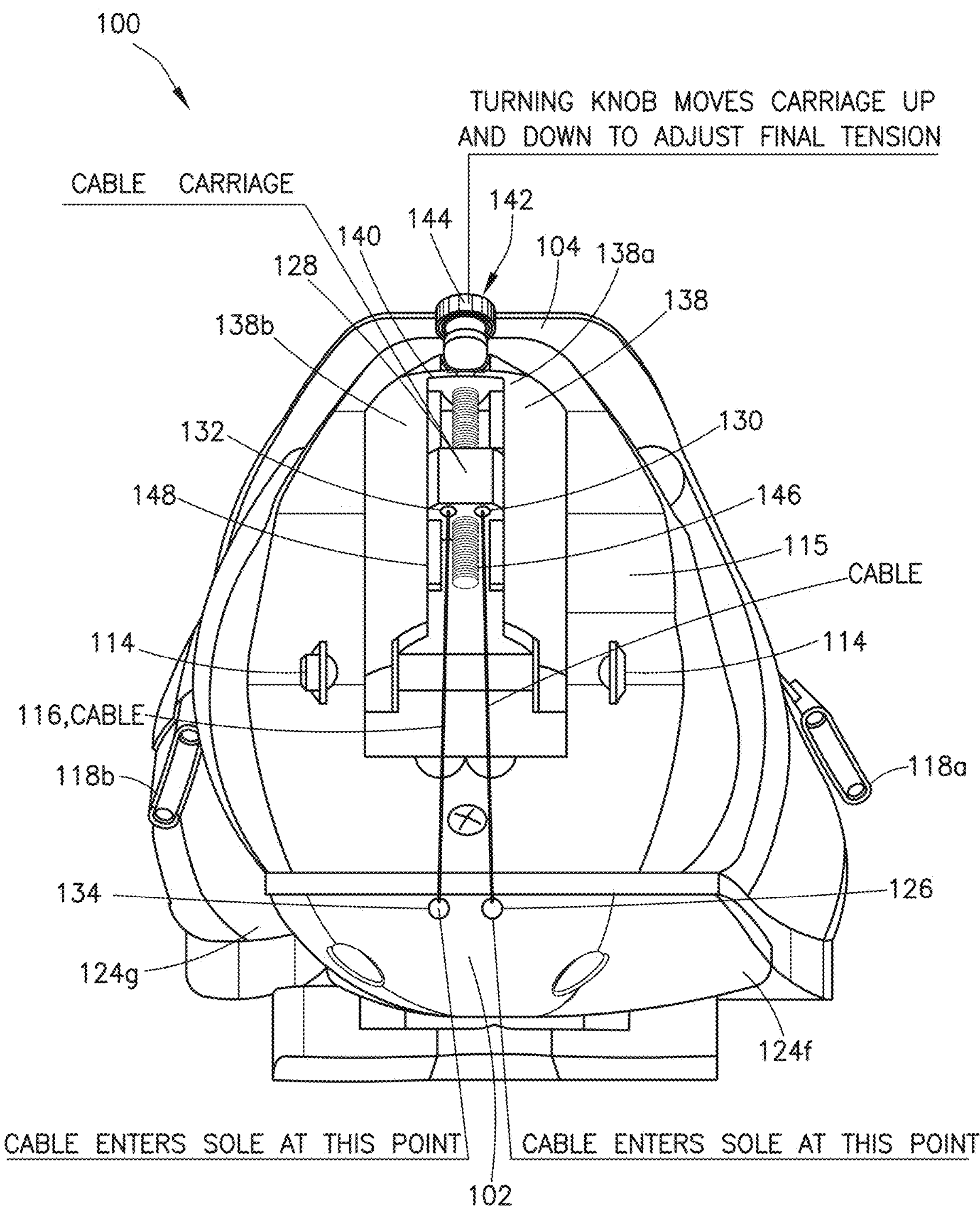
FIG. 3 is a rear view of the cycling shoe of FIG. 1.
Figure 4:
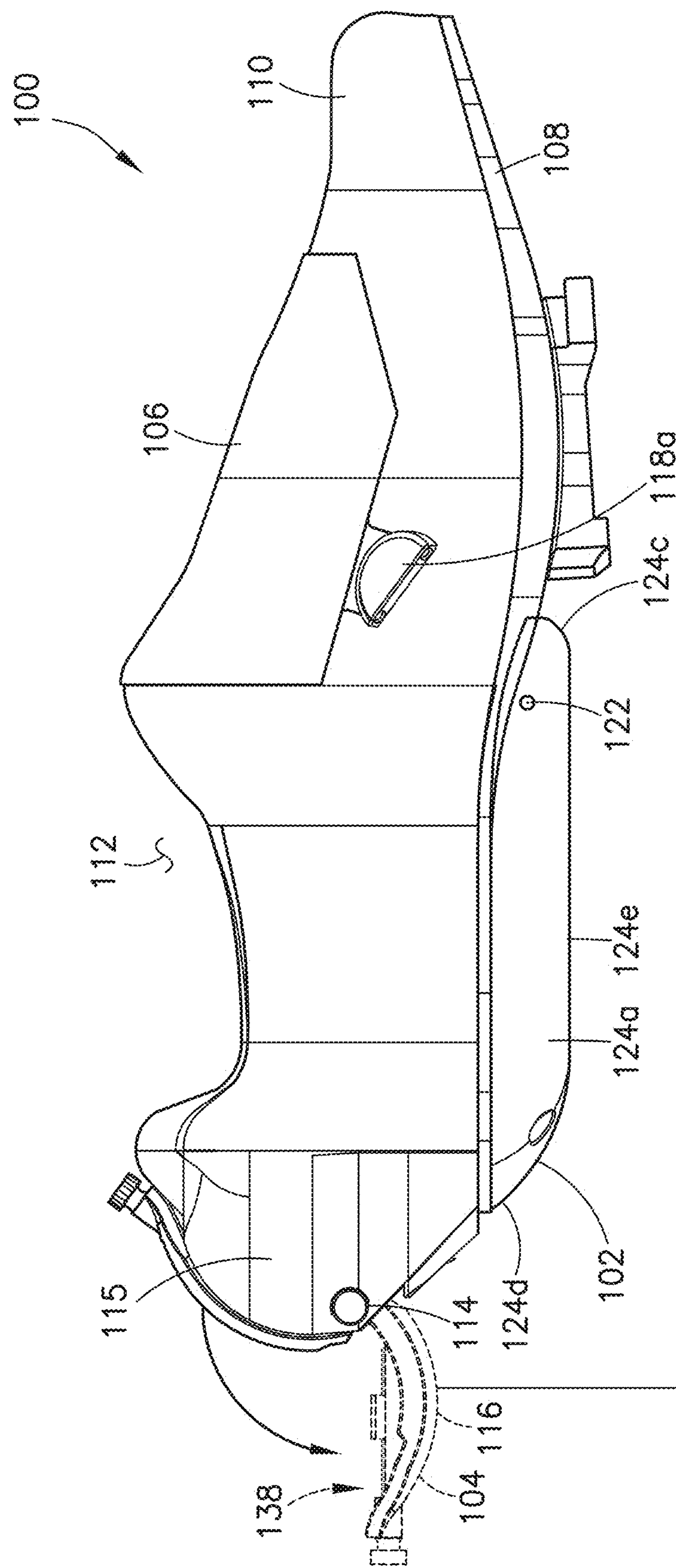
FIG. 4 is a right side view of the cycling shoe in FIG. 1, with the lever assembly in an open configuration.

The lever assembly 104, which is exposed at an outer, rear surface of the upper 110, is movable about a hinge 114 between a first position (e.g., closed, see FIGS. 1-3) and a second position (e.g., open, see FIG. 4). In general, moving the lever assembly 104 from the first position (closed, FIGS. 1-3) to the second position (open, FIG. 4) loosens the shoe's closure mechanism, which allows at least part of the closure panel 106 to be moved away from the upper 110 thereby loosening, or opening, the shoe and increasing the size of the opening 112. In general, moving the lever assembly 104 from the second position (open, FIG. 4) to the first position (closed, FIGS. 1-3) tightens the shoe's closure mechanism, which pulls at least a portion of the closure panel 106 toward the upper 110 to tighten, or close, the shoe 100.

Figure 2:
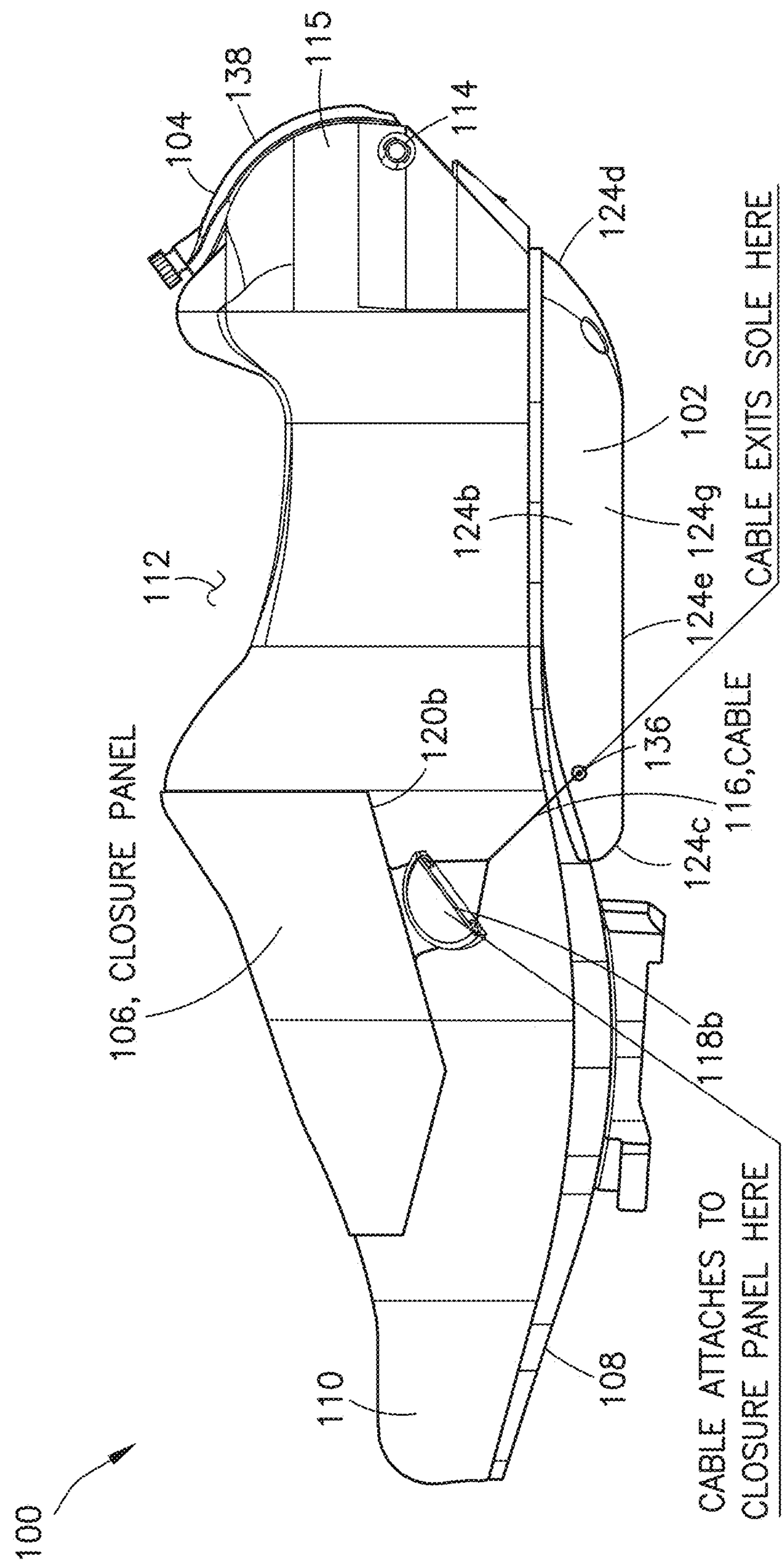
FIG. 2 is a left side view of the cycling shoe of FIG. 1.

In the illustrated implementation, the lever assembly 104 is configured such that in the first position (closed, FIGS. 1-3), the lever assembly 104 substantially conforms to a contour of the rear surface of the upper 110. The rear surface of the upper 110 in the illustrated implementation has a profile that is curved and convex. In this regard, the lever assembly 104 has a pivoting support arm 138 with an outer, rear-facing surface that has a profile that is similarly curved and convex. The pivoting support arm 138 in the illustrated implementation is a rigid structure, which may be made of metal or plastic or the like, that is attached to and pivots about the hinge 114 and that physically supports other elements of the lever assembly 104. In a typical implementation, the fact that the lever assembly 104, in the first position (closed, FIGS. 1-3), substantially conforms to the contour of the rear surface of the upper 110, as shown in FIGS. 1 and 2, for example, helps contribute to the overall aerodynamic nature of the shoe 100.

In the second position (open, FIG. 4), the lever assembly 104 extends away from the upper 110 in a rearward direction from the rear surface of the upper 110. In a typical implementation, the lever assembly 104 swings at least 90 degrees between the closed position (FIGS. 1-3) and a fully open position (FIG. 4). In some implementations, of course, the swing can be less than or greater than 90 degrees.

In the illustrated implementation, there is one, and only one, cable 116 that extends between the lever assembly 104 and the closure panel 106. This cable 116 is configured such that it becomes loose when the lever assembly 104 is moved from the first position (closed, FIGS. 1-3) to the second position (open, FIG. 4), and becomes taut or tight when the lever assembly 104 moves from the second position (open, FIG. 4) to the first position (closed, FIGS. 1-3).

The cable 116, in the illustrated implementation, is routed as follows.

A first end of the cable 116 is attached to a first cable connector 118*a* at a first lateral edge 120*a* of the closure panel 106. In this regard, the first end of the cable 116 forms a loop that extends over, or passes through a passage defined within, the first cable connector 118*a*. The first cable connector 118*a* can take any one of a variety of possible forms. Generally speaking, the first cable connector 118*a* is a physical component or element, to which the cable 116 can be connected (e.g., tied, adhered, looped around, passed through, etc.). In the illustrated implementation, the first cable connector 118*a* is a rigid physical component that defines a roughly semi-circular passage, through which the cable 116 can pass. The first cable connector 118*a* is attached to the side of the closure panel 106 by a small flap of material. In the illustrated implementation, the first end of the cable 116 is shown having been passed through the roughly semi-circular passage of the first cable connector 118*a*, with the very end of the cable 116 connected to the cable 116 (e.g., by twisting or crimping) to form a loop.

The second cable connector 118*b* (at an opposite side of the closure panel 106 from the first cable connector 118*a*) is substantially the same as the first cable connector 118*a* (see FIG. 2). In some implementations, however, the second cable connector 118*b* may be different from the first cable connector 118*a*, or may be omitted from the shoe 100 entirely.

From the loop (that engages the first cable connector 118*a*, see FIG. 1), the cable 116 extends in a downward, and rearward direction to a first hole 122 in a first lateral side surface 124*a* of the projection portion 102 of the shoe 100. The cable 116 enters the first hole 122 and extends through a first passage in the projection portion 102 of the shoe 100. The cable 116 exits the first passage at the rear of the shoe 100 through a second hole 126 (see FIG. 3) in a rear portion 125 of the projection portion 102 of the shoe 100. The cable 116 then extends in a roughly upward direction from the second hole 126 to a cable carriage 128 on the lever assembly 104.

The cable carriage 128 can take any one of a variety of possible forms. Generally speaking, the cable carriage 128 is a physical component or element, to which the cable 116 can be connected (e.g., tied, adhered, looped around, passed through, etc.). In the illustrated implementation, the cable carriage 128 is a rigid physical component that is coupled to, and supported by, the pivoting support arm 138. The illustrated cable carriage 128 has a housing with surfaces that define three, substantially parallel holes that extend through the cable carriage 128 from a bottom surface of the cable carriage 128 to a top surface of the cable carriage 128. Two of the holes are cable holes and are sized and intended to accommodate a cable (e.g., 116) passing through them. The other hole is a threaded hole that is sized and intended to accommodate a threaded rod (146 in FIG. 3). In the illustrated implementation, the cable 116 is shown having been passed up through a first one of the cable holes, across the top of the cable carriage 128, and down through a second one of the cable holes.

The cable 116 extends from the cable carriage 128 in a roughly downward direction toward a third hole 134 in the projection portion 102 of the shoe 100. The cable 116 enters the third hole 134 and extends through a second passage in the projection portion 102 of the shoe 100. The cable 116 exits the second passage through a fourth hole 136 (see FIG. 2) at a second lateral side surface 124*b* (opposite the first lateral side surface 124*a*) of the projection portion 102 of the shoe 100. The cable 116 then extends, in an upward and forward direction toward the second cable connector 118*b* at a second lateral edge 120*b* (opposite the first lateral edge 120*a*) of the closure panel 106. The cable 116 is attached to the second cable connector 118*b* in the same way that the cable 116 is attached to the first cable connector 118*a*.

The first and second passages through the projection portion 102 of the shoe 100 are entirely contained within the projection portion 102 of the shoe 100 and sized to accommodate the cable 116 in a manner that allows the cable 116 to slide through it with ease. The cable is only securely fastened at its ends—to the cable connectors 118*a*, 118*b* at opposite sides of the closure panel 106. Otherwise, the cable is free to slide or move along its path through and around the shoe 100.

There are, of course, other ways that a cable, or cables, may be coupled to and routed through the shoe 100.

The shoe's closure mechanism, in the illustrated implementation, includes the adjustable closure panel 106 (with the cable connectors), the cable 116, and the lever assembly 104.

The lever assembly 104 (see, e.g., FIG. 3), in the illustrated implementation, includes the cable carriage 128, a guide 148 for the cable carriage 128, an adjuster 142 for the cable carriage 128, and the pivoting support arm 138 that directly or indirectly supports the other components of the lever assembly 104.

The pivoting support arm 138 is coupled to the hinge 114 and configured to pivot about an axis defined by the hinge 114. The hinge 114 in the illustrated implementation is a split hinge, meaning that the hinge 114 has two hinge portions that are not physically connected to one another (e.g., by a straight shaft or the like). The hinge 114 is supported by an extension 115 off a rear portion of the upper 110, with one portion of the hinge 114 being at a first lateral side of the extension 115 and the other portion of the hinge 114 being closer to a second lateral side of the extension 115 (opposite the first lateral side). In a typical implementation, the extension 115 includes one or more rigid (e.g., plastic) pieces that are attached to the upper 110 via adhesive or other method. With the shoe 100 oriented in a substantially horizontal plane, the axis of the hinge 114 extends in a substantially horizontal direction from one hinge portion to the other across the back of the shoe 100 (see FIG. 3).

According to the illustrated implementation, one portion of the hinge 114 is attached to and supports a first portion 138*a* of the pivoting support arm 138, and the other portion of the hinge 114 is attached to and supports a second portion 138*b* of the pivoting support arm 138. Collectively, the two portions of the hinge 114 allow the pivoting support arm 138 to pivot about its axis. There is an empty space between the two portions of the hinge 114 (and between the first portion 138*a* of the pivoting support arm 138 and the second portion 138*b* of the pivoting support arm 138). The empty space lets the portions of the cable 116 that extend from the cable carriage 128 to the second and third holes 126, 134 to move through the empty space, without physically contacting any other portion of the shoe, as the pivoting support arm 138 pivots about hinge 114. Thus, the portions of the cable 116 that extend from the cable carriage 128 to the second and third holes 126, 134 can remain straight regardless of whether the lever assembly 104 is in a closed position (FIGS. 1-3) or an open position (FIG. 4).

In the illustrated implementation, the first portion 138*a* and second portion 138*b* of the pivoting support arm 138 are parallel and substantially mirror images of each other. It is not, however, a requirement that the first portion 138*a* and the second portion 138*b* of the pivoting support arm 138 be parallel or substantially mirror images of each other. In some implementations, the pivoting support arm 138 is a more complicated shape and the two sides are not mirror images, and while important invisible axes of the two sides may be parallel to each other, it is perhaps not apparent to most observers because of the complexity of the shape.

In the illustrated implementation, the first portion 138*a* is a rigid structure that extends from a first portion of the hinge 114 in a direction that is substantially upward (when the shoe 100 is closed, FIGS. 1-3) but substantially rearward (when the shoe is in the open position represented by FIG. 4). The second portion 138*b*, is similarly a rigid structure that extends from a second portion of the hinge 114 in a direction that is substantially upward (when the shoe 100 is closed, FIGS. 1-3) but substantially rearward (when the shoe is in the open position represented by FIG. 4).

The first portion 138*a* of the pivoting support arm 138 and the second portion 138*b* of the pivoting support arm 138 are connected together at a distal end thereof by a connector 140 and, therefore, move as one about the axis defined by the hinge 114.

According to the illustrated implementation, the guide 148 for the cable carriage 128 has a pair of tracks that are formed on respective surfaces of the first and second portions 138*a*, 138*b* of the pivoting support arm 138 and that face each other. Each track is configured to engage, or extend into, a corresponding recess on one of the side surfaces of the cable carriage 128. With this configuration, the cable carriage 128 is supported by the guide 148, but able to slide along the tracks of the guide 148.

The adjuster 142 for the cable carriage 128 in the illustrated implementation has a knob 144 and a threaded rod 146 that extends from the knob 144. The knob 144 is positioned at the distal end of the lever assembly 104 and the threaded rod extends from the knob 144 through an opening in the connector 140 (or bracket) and through the threaded hole in the cable carriage 128. The adjuster 142 is configured such that it can be rotated about its axis (e.g., by gripping and turning the knob 144) but remains substantially fixed in an axial direction relative to the pivoting support arm 138, for example. The threads on the threaded rod 146 engage the threads of the threaded hole in the cable carriage 128. Thus, when the adjuster is rotated, the engagement between the threads on the threaded rod 146 and the threads in the threaded hole of the cable carriage 128 causes the cable carriage 128 to move along guide 148 (e.g., its tracks) in a depending that depends on the direction of rotation.

Referring to FIG. 3, if the cable carriage 128 is moved in an upward direction (i.e., toward the distal end of its track), then the cable 116 will become more taut, or tighter. Conversely, if the cable carriage 128 is moved in a downward direction (i.e., toward a proximate end of its track), then the cable 116 will become looser. In this manner, the adjuster 142 may be considered a tension adjuster.

The cycling shoe 100 may be sold with or without cable(s) attached to the shoe 100. Either way, the cable(s) will need to be installed on the shoe 100 (either before or after being sold), and over time the cable(s) will need to be replaced. In a typical implementation, before installing a cable on the shoe 100, the cyclist, for example, might manipulate the knob 144 of the tension adjuster 142 to move the cable carriage 128 as close to the bottom (proximate portion) of its guide (or track) as possible. The cyclist also may move the lever assembly 104 to an open position (see, e.g., FIG. 4).

Then, the cyclist may pass one end of the cable 116 through or around the first cable connector 118*a* and create a loop at that end of the cable 116 (e.g., by twisting or crimping) to ensure that the cable 116 remains secured to the first cable connector 118*a*. Then, the cyclist may pass the cable 116 through the first passage in the projection portion 102 of the shoe 100 to the rear of the shoe 100. Then, the cyclist may pass the cable 116 through a first one of the cable holes in the cable carriage 128, and back through a second one of the cable holes in the cable carriage. Then, the cyclist may pass the cable 116 through the second passage in the projection portion 102 of the shoe 100 toward the front of the shoe 100. Then, the cyclist may pass the leading end of the cable 116 through or around the second cable connector 118*a* and create a loop at that end of the cable 116 (e.g., by twisting or crimping) to ensure that the cable 116 remains secured to the second cable connector 118*a*.

At this point, the cable 116 may be, and probably will be, a bit looser than ideal. If so, then the cyclist may manipulate the knob 144 of the tension adjuster 142 to move the cable carriage 128 toward the distal end of the lever assembly 104 thereby tightening the cable 116. The desired tightness may be one where the shoe 100 will be tight enough when the lever assembly 104 is flipped up into the closed position, but loose enough to allow putting the shoe on and off when the lever assembly 104 is flipped down into the open position.

Figure 5:
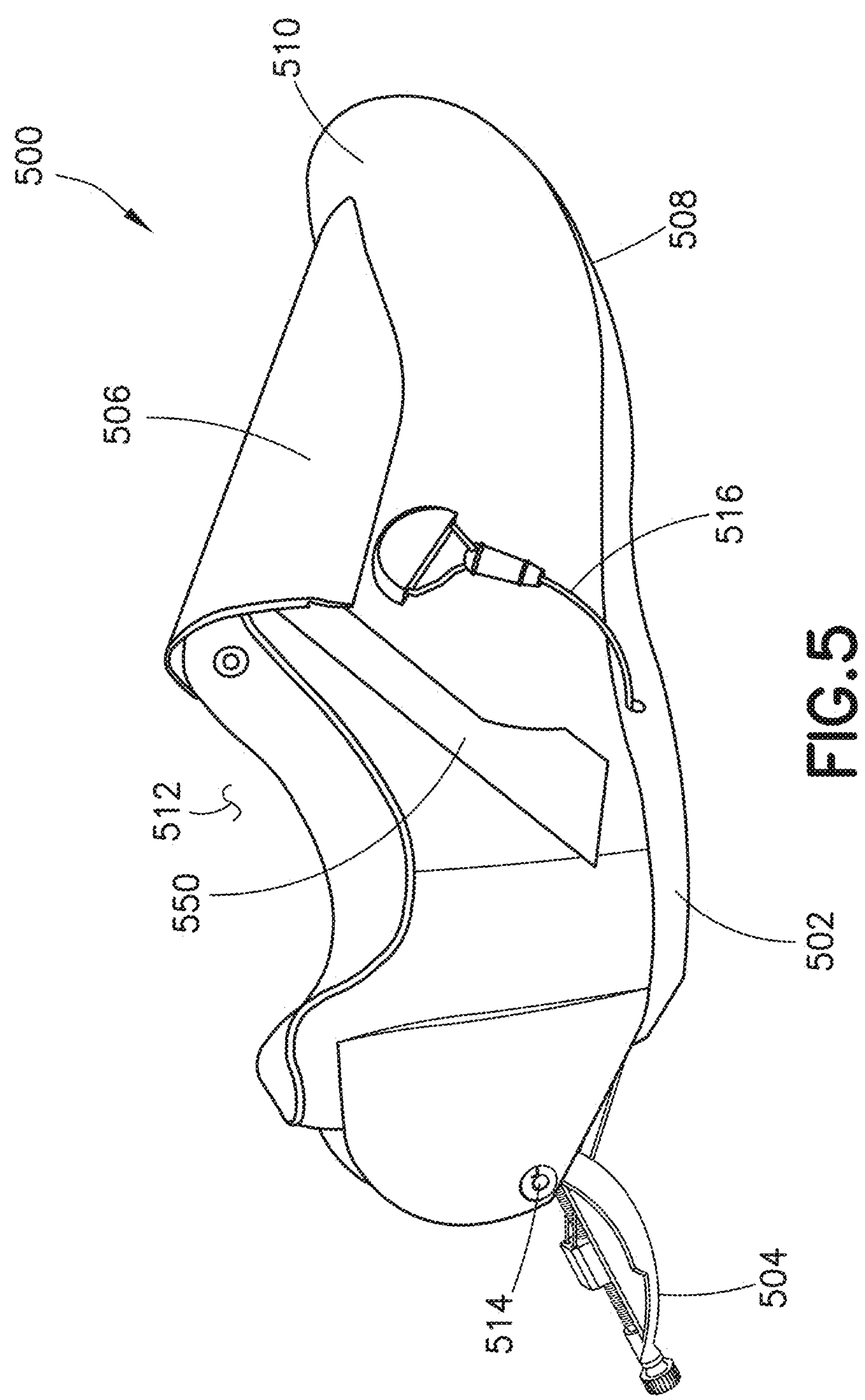
FIG. 5 is a right side view of an alternative implementation of a cycling shoe.
Figure 6:
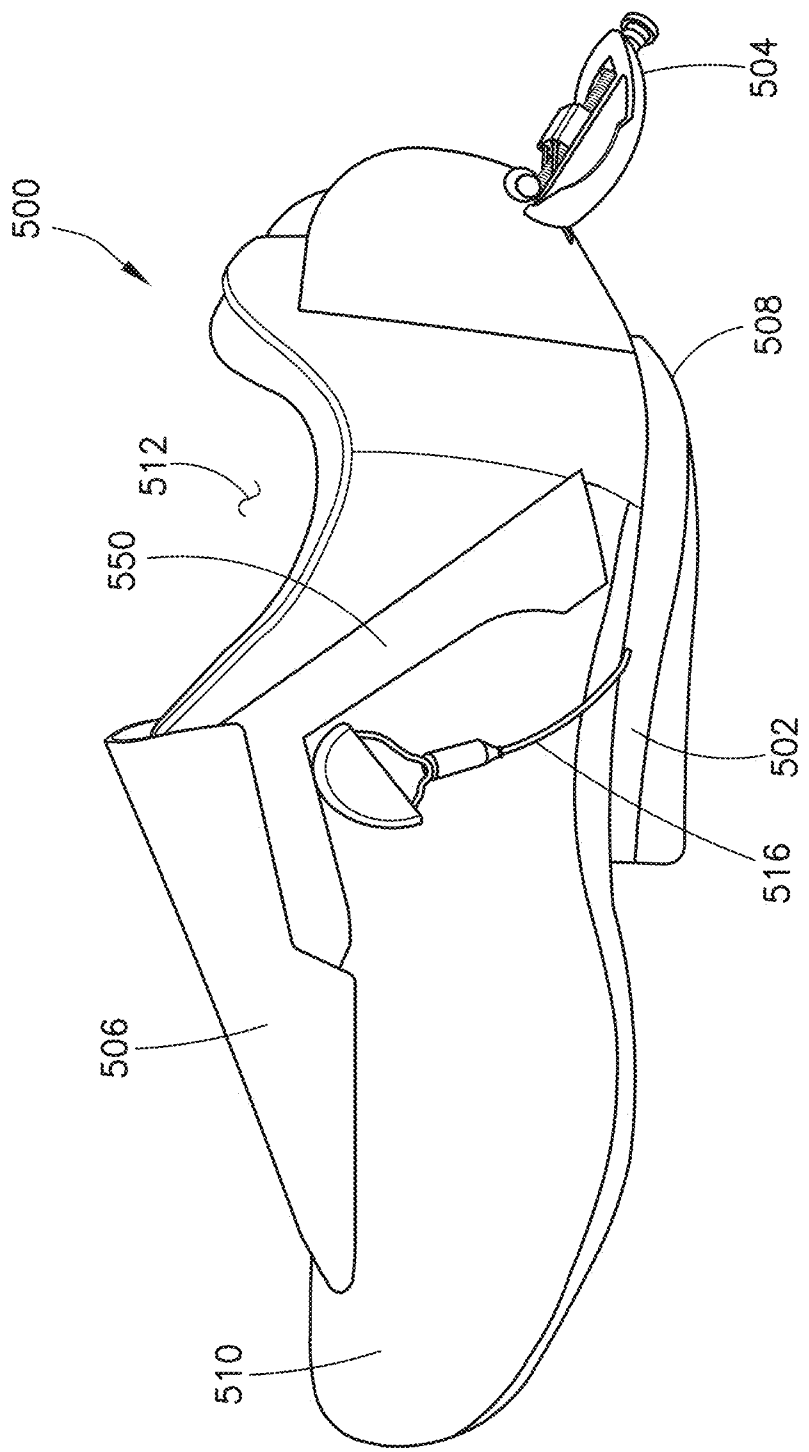
FIG. 6 is a left side view of the cycling shoe of FIG. 5.
Figure 7:
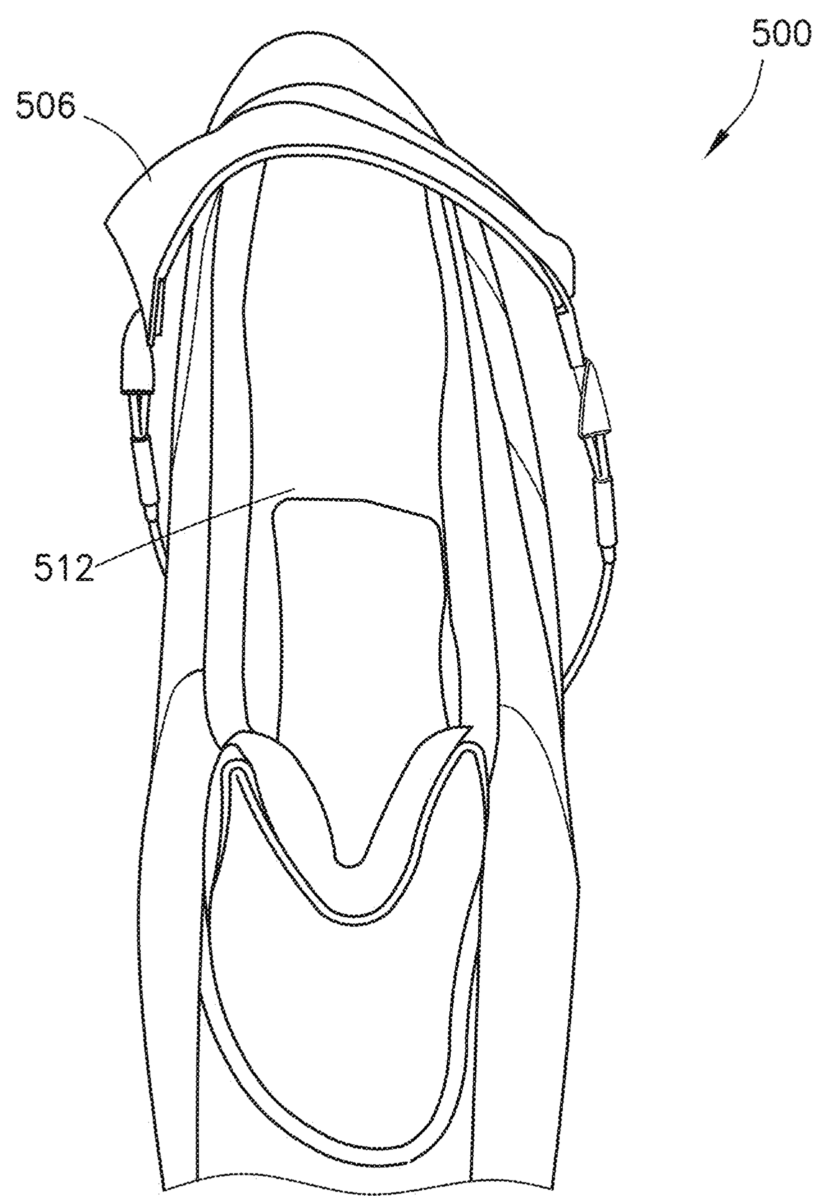
FIG. 7 is a forward facing view, from the rear, of the cycling shoe of FIG. 5.

FIGS. 5-7 show an implementation of a cycling shoe 500 that is similar to the cycling shoe 100 of FIG. 1.

In this regard, the cycling shoe 500 has a sole 508 and an upper 510 attached to the sole 508. An adjustable closure panel 506 extends across an opening in a top portion of the upper 510. Collectively, the sole 508, the upper 510, and the closure panel 506 define an interior foot compartment for receiving the foot of a cyclist. The upper 510 and the closure panel 506 also collectively define the opening 512 for a foot in the top portion of the cycling shoe 500 into the foot compartment. During use, a cyclist can slide his or her foot through the opening 512 and into the foot compartment to put the shoe on. The cycling shoe 500 has a closure mechanism that includes the adjustable closure panel 506 (with cable connectors), a cable 516, and a lever assembly 504. The cable 516 passes through passages in a projection portion 502 of the shoe 500 that extends off a bottom of the sole 508 of the shoe 500.

A notable difference between the cycling shoe 500 of FIGS. 5 and 6 and the cycling shoe 100 of FIG. 1 is that the cycling shoe 500 of FIGS. 5 and 6 is fitted with a strip 550 of semi-rigid, but flexible material that is attached (e.g., with adhesive, stitching, etc.) to opposite lateral side surfaces of the shoe 500 and that extends to the opening of the upper 510 and contact a portion of the closure panel 506 that extends over the upper 510. Thus, each strip 550 is configured to urge the opening of the upper to be more open and the closure panel 506 at the top of the shoe 500 away from the upper 510 so that when the shoe is open (as in FIGS. 5 and 6), the closure panel 506 is pushed away from the upper 510, making the opening 512 for the foot larger than it otherwise might be. This enables the cyclist to easily slip his or her foot inside the shoe when the shoe 500 is open and minimizes the risk that the adjustable closure panel 506 might interfere with cyclist's efforts in this regard.

The material, specific configuration (e.g., length, width, thickness, location), and performance characteristics of each strip 550 can vary. In some implementations, the material, width and thickness of each strip 550 is such that, if supported as a cantilever with 500 g of mass hung 50 millimeters from the fixed end, the end will deflect in the range of 9 millimeters to 30 millimeters. This characteristic can be achieved using a variety of materials. A stiff material such as carbon fiber can be used if the cross-sectional area of the piece to be glued, or otherwise attached, to the shoe is relatively small. A less stiff material such as a non-reinforced plastic can obtain the same result with a larger cross-sectional area.

Figure 8:
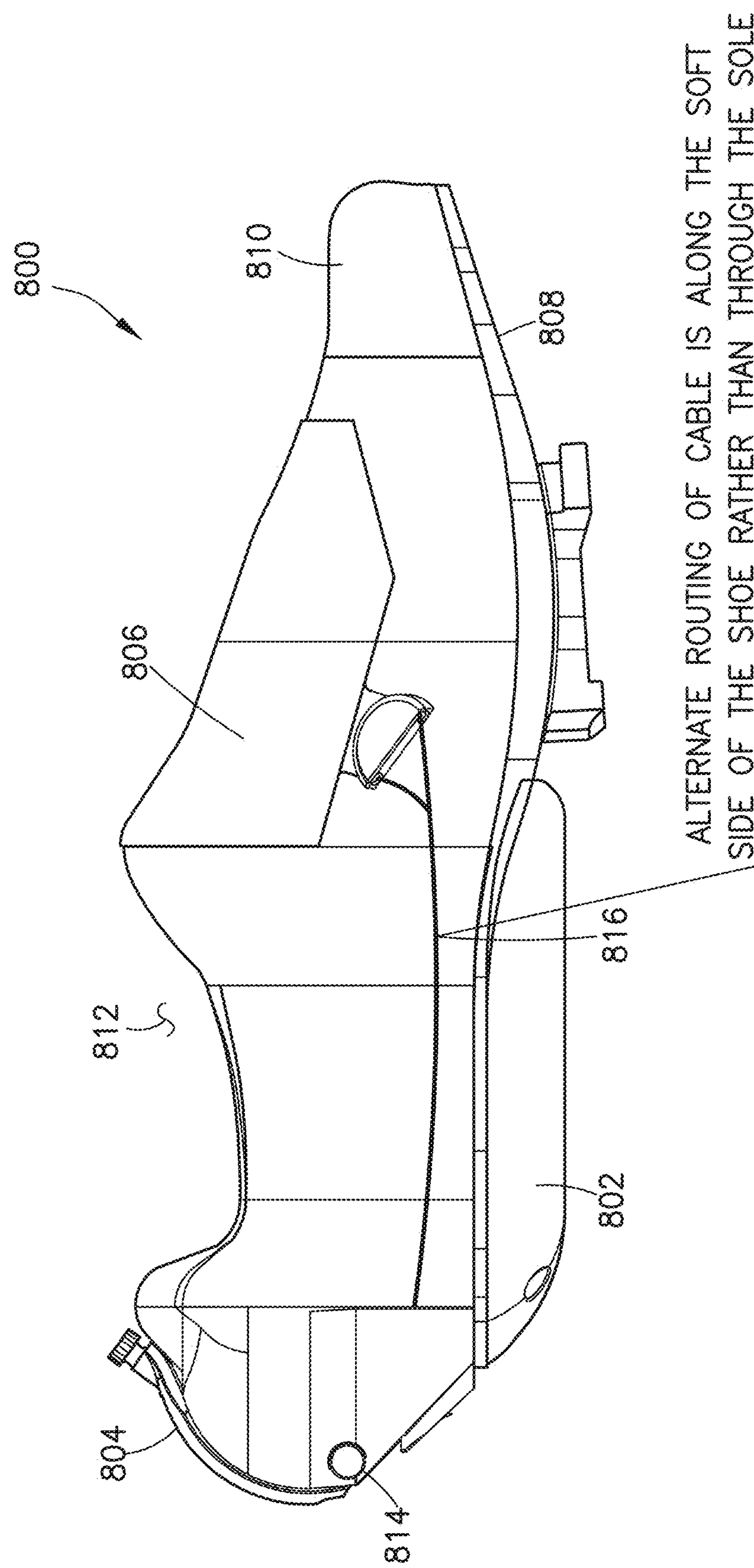
FIG. 8 is a right side view of another alternative implementation of a cycling shoe.

FIG. 8 shows another implementation of a cycling shoe 800 that is similar to the cycling shoe 100 of FIG. 1.

In this regard, the cycling shoe 800 has a sole 808 and an upper 810 attached to the sole 808. An adjustable closure panel 806 extends across an opening in a top portion of the upper 810. Collectively, the sole 808, the upper 810, and the closure panel 806 define an interior foot compartment for receiving the foot of a cyclist. The upper 810 and the closure panel 806 also collectively define an opening 812 for a foot in the top portion of the cycling shoe 800 into the foot compartment. During use, a cyclist can slide his or her foot through the opening 812 and into the foot compartment to put the shoe on. The cycling shoe 800 has a closure mechanism that includes the adjustable closure panel 806 (with cable connectors), a cable 816, and a lever assembly 804 (shown in the closed position in FIG. 8). The cycling shoe 800 of FIG. 8 also has a projection portion 802, like the projection portion 102 in FIGS. 1-4.

The cable 816 in the shoe 800 of FIG. 8 is routed differently than the cable 116 in the shoe 100 of FIGS. 1-4. More specifically, the cable 816 in the shoe 800 of FIG. 8 does not pass through the projection portion 802 of the shoe 800. Instead, the cable 816 in the shoe 800 of FIG. 8 extends from the cable connector along an outer side surface of the shoe in a rearward direction, through an opening between the upper 810 and the extension 815 at the rear of the shoe 800, and to the lever assembly 804. In a typical implementation, the side of the shoe 800 opposite the one shown in FIG. 8 would be a mirror image of FIG. 8.

Even though the cable 816 in the shoe 800 of FIG. 8 does not pass through the projection portion 802 of the shoe 800, the shoe 800 still has a projection portion 802. As discussed elsewhere, herein, the projection portion 802 of the shoe 800 helps make the overall shoe 800 more aerodynamic, especially when in a toe-down configuration.

Referring again to FIGS. 1-4, the projection portion 102 on the bottom of the cycling shoe 100 has a particular shape and position that contributes to the shoe's 100 overall aerodynamic nature. The projection portion 102 in the illustrated implementation extends off a bottom surface of the sole 108 of the cycling shoe 100 behind a cleat portion of the sole 108 (i.e., a portion of the sole 108 that can accommodate the cycling cleat 152). In a typical implementation, the cycling cleat 152 engages the sole 108 of the cycling shoe 100 via an attachment means (e.g., one or more screw holes in the bottom of the sole 108 that are can receive screws or the like that hold the cleat onto the sole 108). Moreover, in some implementations (see, e.g., FIG. 1), when a cleat is attached to the sole of the shoe 100, there is a space (of at least 3 millimeters) between the rear-most surface of the cleat and the forward-most surface of the projection portion 102. However, in some implementations, there are types of cleats where no space would be required or present.

In the illustrated implementation, the projection portion 102 has surfaces that roughly define a first lateral side surface 124*a*, a second lateral side surface 124*b* at an opposite side of the cycling shoe 100 from the first lateral side surface, a front side surface 124*c*, a rear side surface 124*d*, and a bottom surface 124*e*. The bottom surface 124*e* extends between and connects the side surfaces, including the first lateral side surface 124*a*, the second lateral side surface 124*b*, the front side surface 124*c*, and the rear side surface 124*d*. Rounded lateral edges 124*f*, 124*g* (see FIG. 3 and FIG. 10) connect each of the first and second lateral side surfaces 124*a*, 124*b* to the bottom surface 124*e*. These rounded lateral edges 124*f*, 124*g* give the shoe 100 a highly aerodynamic profile, particularly when the shoe 100 is on a pedal in a toe-down configuration (i.e., with the toes pointed down toward the ground, as shown in FIG. 9).

Figure 9:
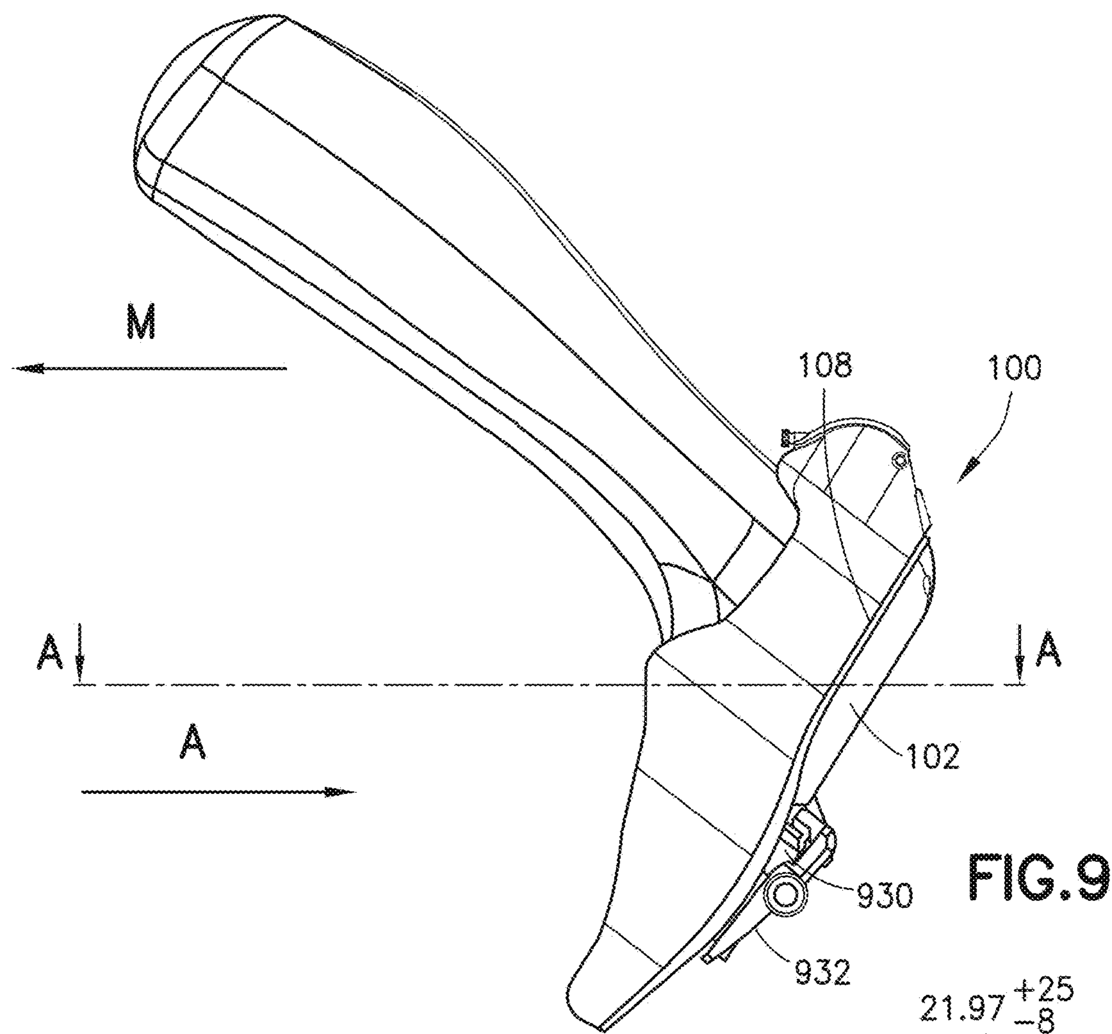
FIG. 9 is a left side view of yet another implementation of a cycling shoe coupled to a cleat.

FIG. 9 shows a schematic representation of cycling shoe 100 on the foot of a cyclist. There is a cleat 930 attached to the sole of the cycling shoe 100 in a cleat portion of the sole. The cleat 930 is engaged with the pedal 932 of a bicycle, not shown, and the cyclist's foot is in a toe-down configuration (i.e., pointing toward the ground). The bicycle is moving in the direction of arrow M, which results in air resistance (caused by air, or "apparent wind," moving toward and around the shoe 100 in a direction A, opposite direction M).

With the shoe 100 configured as shown, the projection portion 102 off the sole 108 is at a backside of the shoe 100 relative to the cyclist's motion. Therefore, the air moving in direction A, flows around the lateral side edges of the shoe 100, the lateral side surfaces 124*a*, 124*b* of the projection portion 102*a*, and the rounded lateral edges 124*f*, 124*g* of the projection portion 102 and, finally, behind the shoe 100. The applicant has discovered that the overall shoe 100 configuration, and particularly the rounded lateral edges 124*f*, 124*g* of the projection portion 102*a*, reduces air turbulence behind the shoe when in a toe down configuration (as in FIG. 9). This design reduces aerodynamic drag while the foot is in a toe-down position (as shown in FIG. 9) while cycling.

Figure 10:
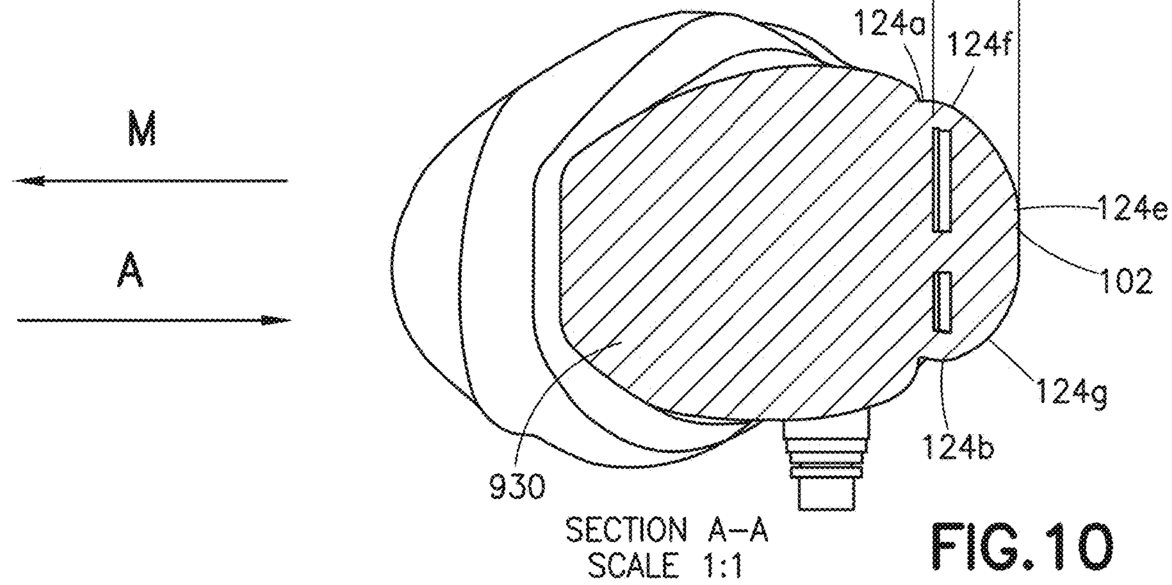
FIG. 10 is a cross-section of FIG. 9 (taken at line A-A).

FIG. 10 is a cross-sectional view of the shoe 100 of FIG. 9 taken along line A-A. Again, the projection portion 102 is shown at a backside of the shoe 100 relative to the cyclist's motion so that, as the cyclist moves (in direction M), the air moves (in direction A) around the lateral sides of the shoe 100, past the rounded lateral edges 124*f*, 124*g* of the projection portion 102 and, finally, behind the shoe 100. The lateral side surfaces 124*a*, 124*b* of the projection portion 102*a*, and the rounded lateral edges 124*f*, 124*g* of the projection portion 102 are labeled. Again, arrow M shows the direction of cyclist motion, and arrow A shows the direction of apparent wind toward the shoe 100.

Figure 11:
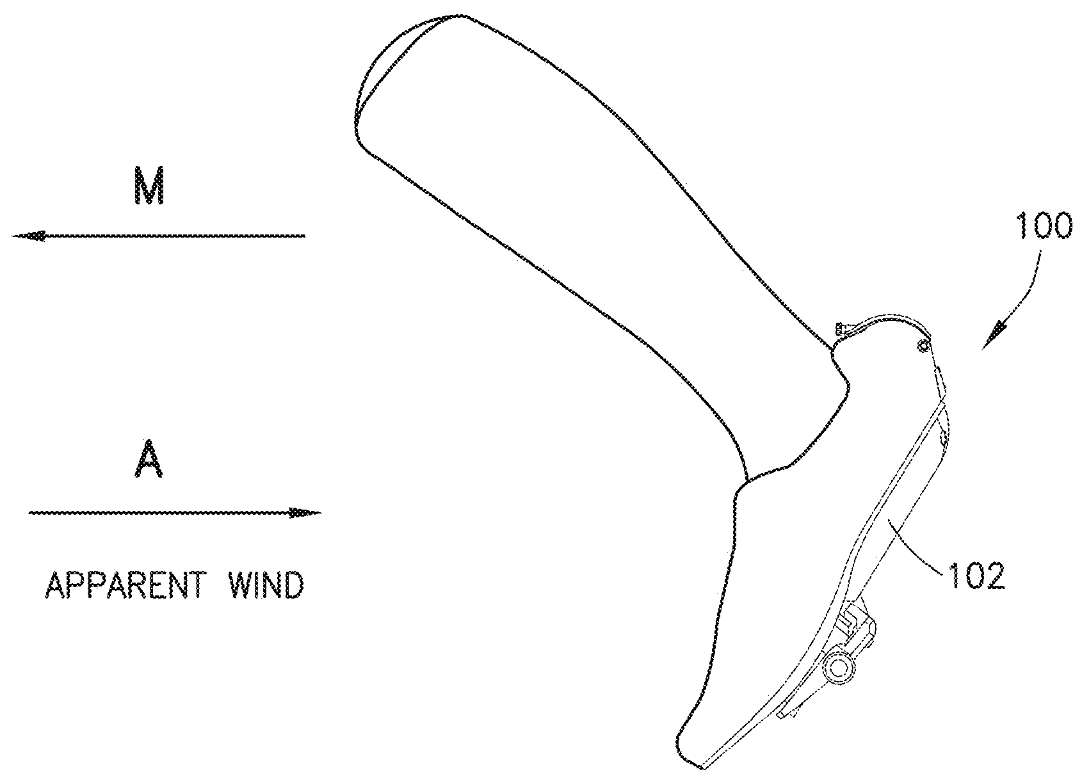
FIGS. 11 and 12 show a schematic representation of an exemplary shoe that includes a projection portion, on the foot of a cyclist who is riding in direction M in a toe-down configuration, with apparent wind indicated.
Figure 12:
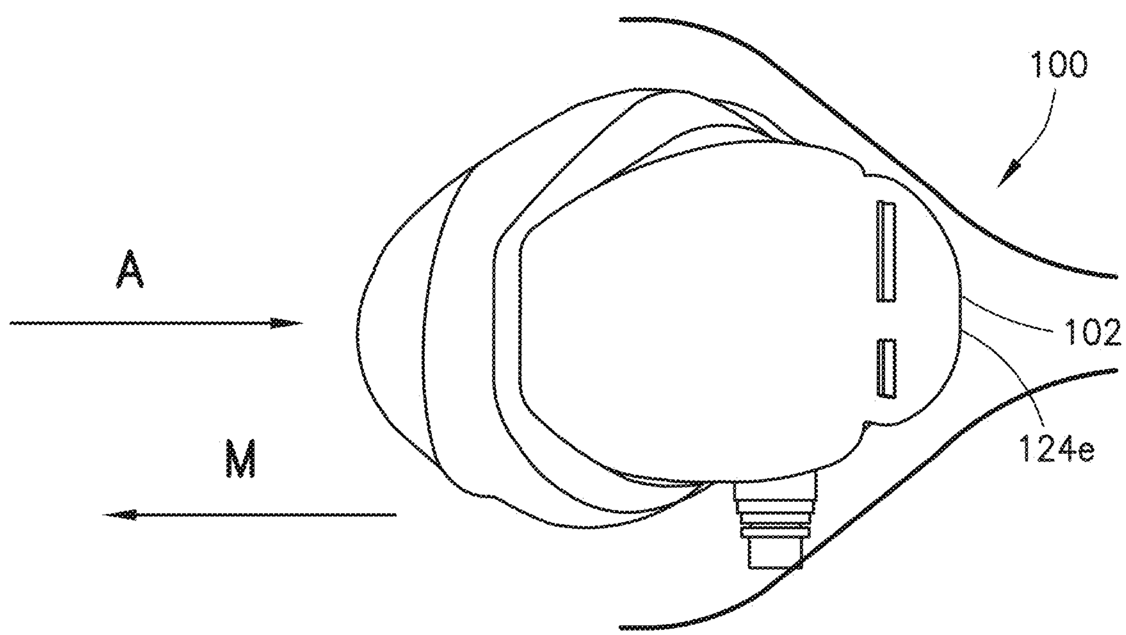

FIGS. 11 and 12 show a schematic representation of the shoe 100 on the foot of a cyclist who is riding in direction M in a toe-down configuration. The apparent wind A encounters the top of the foot, separates to go around the sides of the foot and then comes back together smoothly and gradually behind the flat sole of the shoe. This design results in very low turbulence behind the shoe, and low drag while the cyclist is riding.

When the shoe 100 is in a toe-down position (as shown), the shape of the sole is such that the cross section of the shoe 100 in the plane of the wind direction is such that the trailing edge of the shoe is rounded rather than substantially flat. It is rounded in a concave shape. The furthest point of the trailing edge of the shoe in a 55-degree toe-down position is about 22 mm from where the flat sole of a conventional sole would be (if the projection portion were not present). Viable variations from this dimension can range from 14 mm to greater than 47 mm. In some implementations, the range might be between 17 mm and 37 mm. (see, e.g., FIG. 10). In a typical implementation, each rounded lateral edges of the projection portion has a radius of no less than 7 mm; in an exemplary implementation, the radius is between about 10 mm and 50 mm millimeters.

Figure 13:
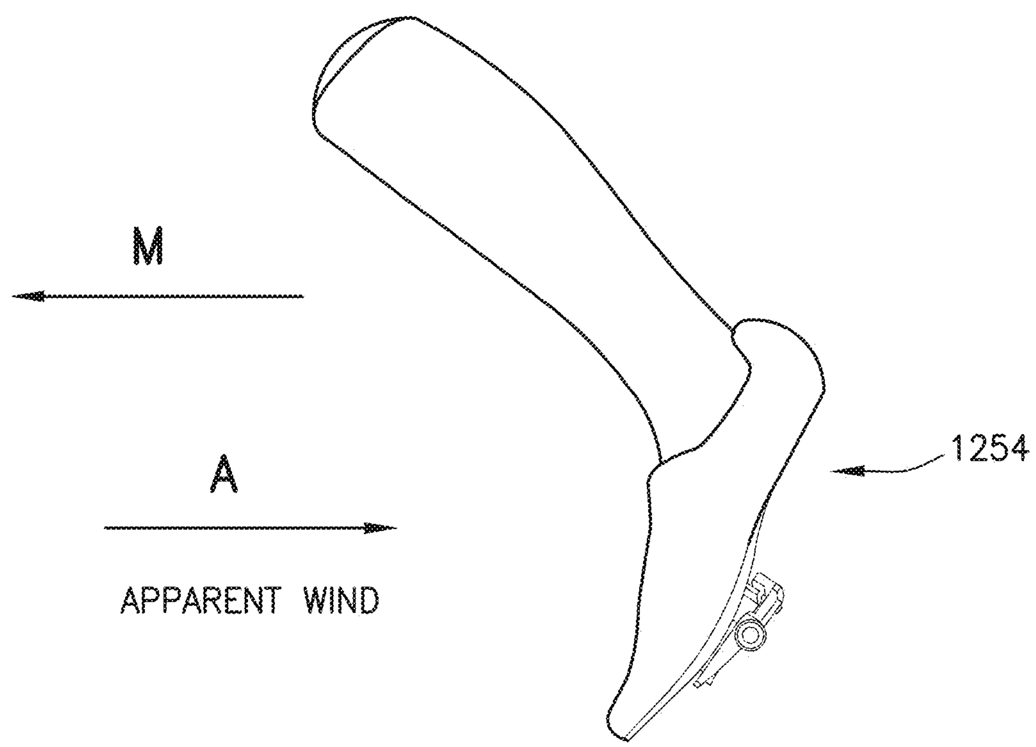
FIGS. 13 and 14 show a similar schematic representation of a shoe that does not include a projection portion.
Figure 14:
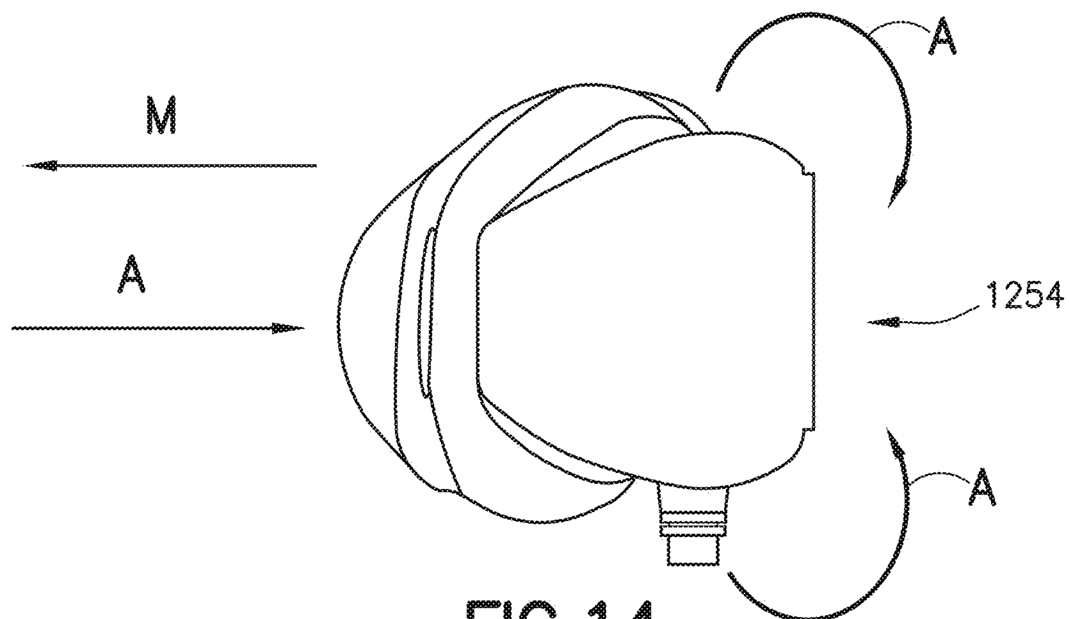

For comparison purposes, FIGS. 13 and 14 show a schematic representation of a shoe with a flat bottom (and no projection portion) on the foot of a cyclist who is riding in direction M in a toe-down configuration. The apparent wind A encounters the top of the foot, separates to go around the sides of the foot and then comes back together rather turbulently behind the flat sole of the shoe. This design produces a great deal of turbulence behind the shoe, and the cyclist will experience a great deal of drag while riding.

Computational fluid dynamics simulations confirm that, in a typical implementation, the design(s) disclosed herein produce(s) the advantages mentioned herein and also provide good visualization of the improvement in airflow.

Figure 15:
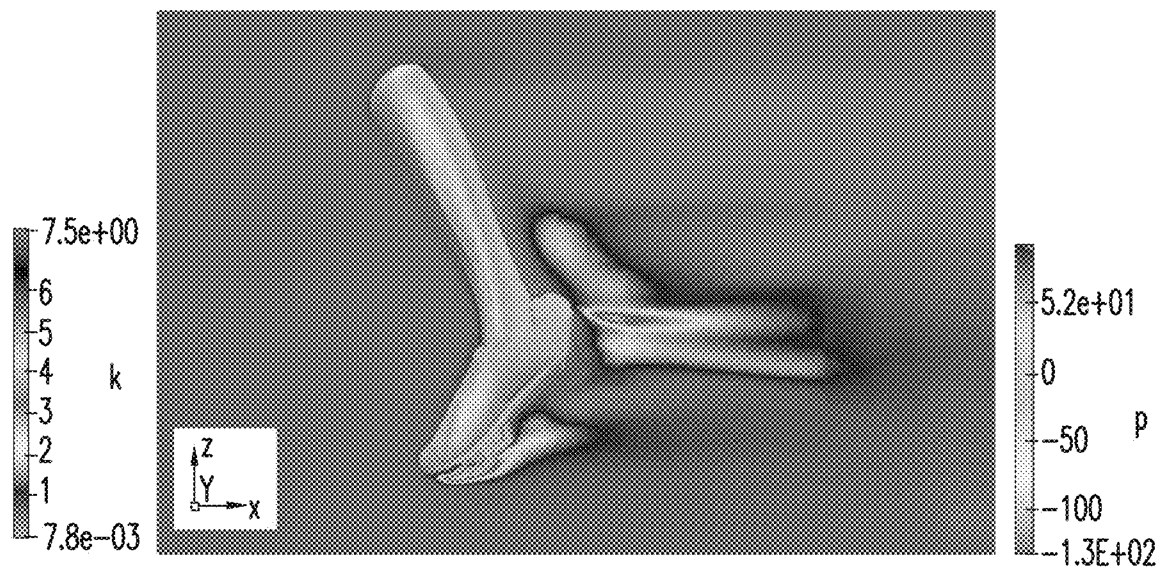
FIG. 15 shows a computational fluid dynamics simulation of a shoe that includes a projection portion.
Figure 16:
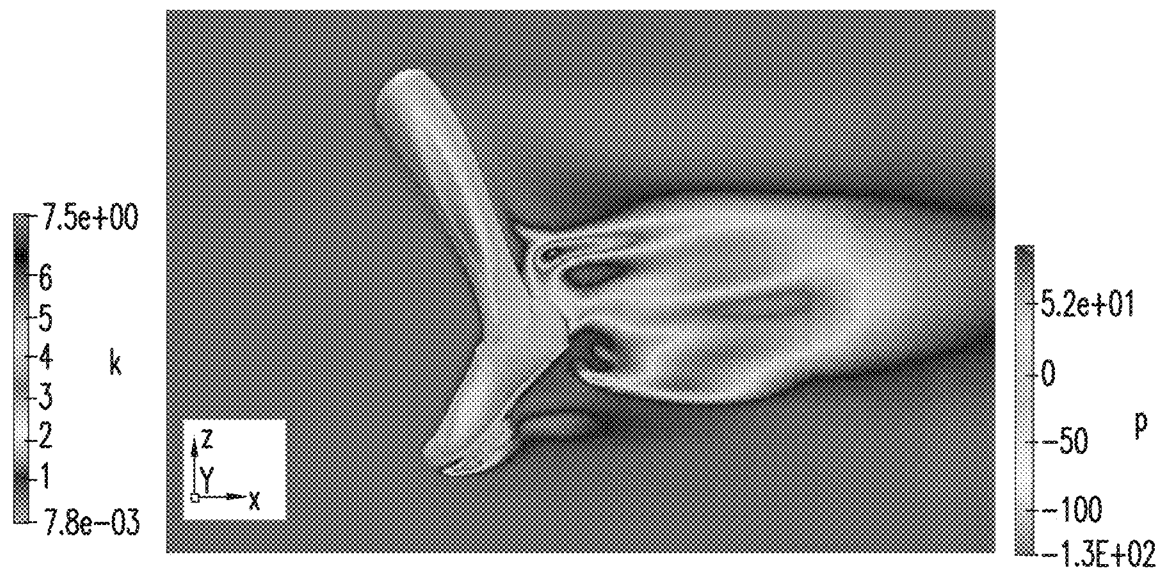
FIG. 16 shows a computational fluid dynamics simulation of a shoe that does not include a projection portion.

FIGS. 15 and 16, for example, show computational fluid dynamics simulations of one shoe (like the one in FIG. 1) that includes a projection portion (FIG. 15), and a different shoe (without a projection portion) (FIG. 16), both in a toe down configuration, moving and experiencing a resulting apparent wind. The condition (e.g., the speed of the apparent wind) in both simulations is identical. From these simulations, it can be seen that the amount of turbulence behind the FIG. 16 (no projection portion) shoe is far greater than the amount of turbulence behind the FIG. 15 (projection portion) shoe.

Figure 17:
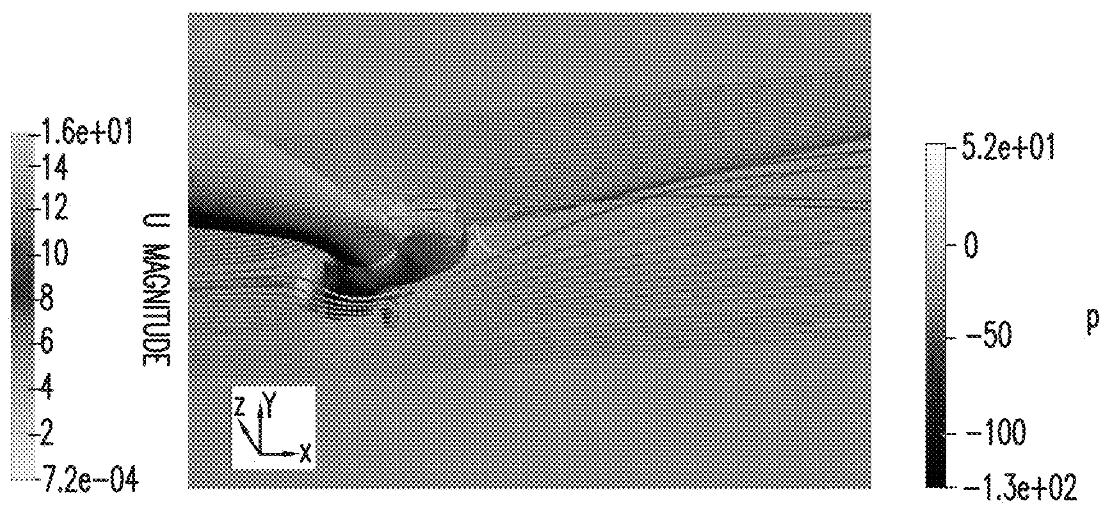
FIG. 17 shows computational fluid dynamics simulation of a shoe that includes a projection portion.
Figure 18:
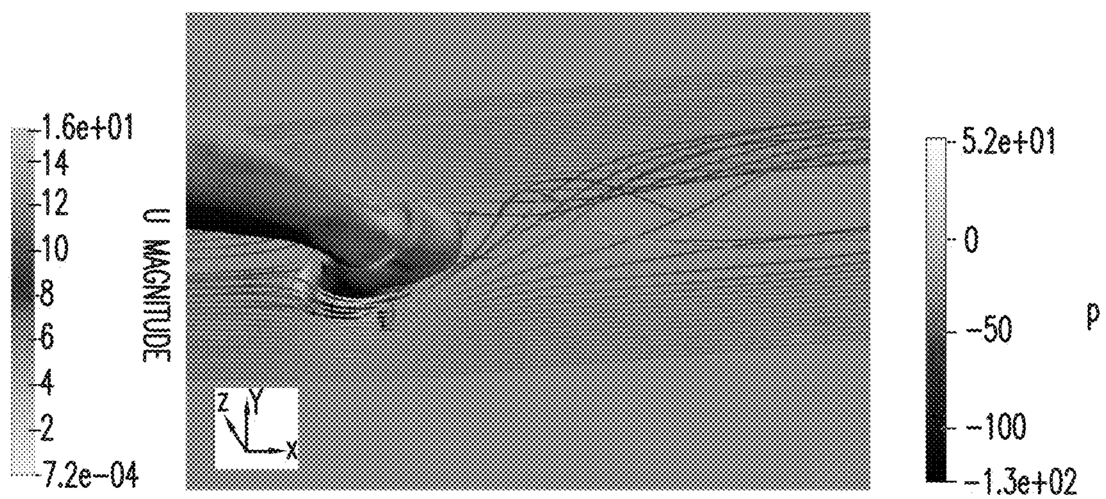
FIG. 18 shows a computational fluid dynamics simulation of a shoe that does not include a projection portion.

Likewise, FIGS. 17 and 18 show computational fluid dynamics simulations of one shoe (like the one in FIG. 1) that includes a projection portion (FIG. 17), and a different shoe (without a projection portion) (FIG. 18), both in a toe down configuration, moving and experiencing a resulting apparent wind. The condition (e.g., the speed of the apparent wind) in both simulations is identical. From these simulations, it can be seen that the amount of turbulence behind the FIG. 18 (no projection portion) shoe is far greater than the amount of turbulence behind the FIG. 17 (projection portion) shoe—this is evident from the less swirling of streamlines in FIG. 17 than in FIG. 18. Moreover, the air velocity behind the trailing edge of the shoe is higher in the FIG. 17 (projection portion) shoe as compared to the FIG. 18 (no projection portion) shoe.

Figure 19:
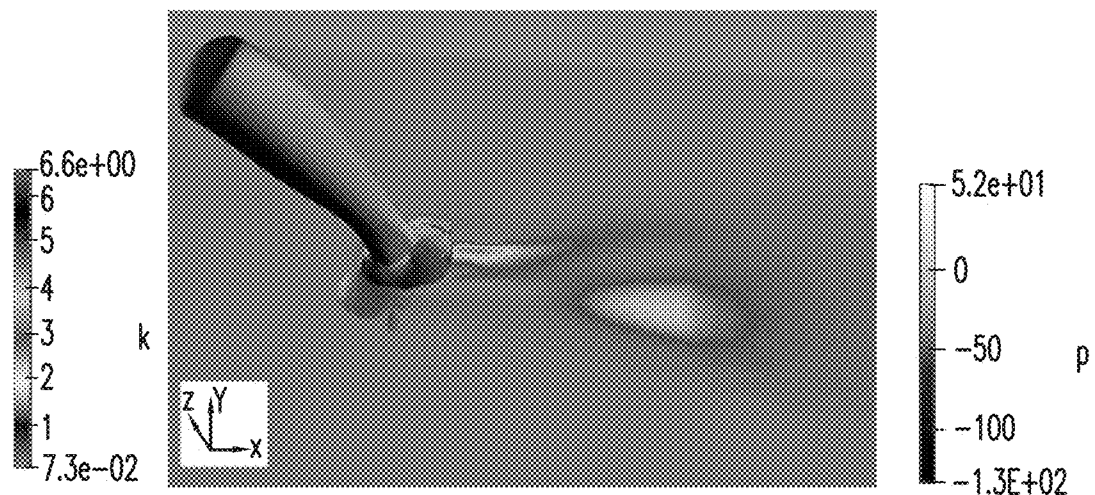
FIG. 19 shows computational fluid dynamics simulation of a shoe that includes a projection portion.
Figure 20:
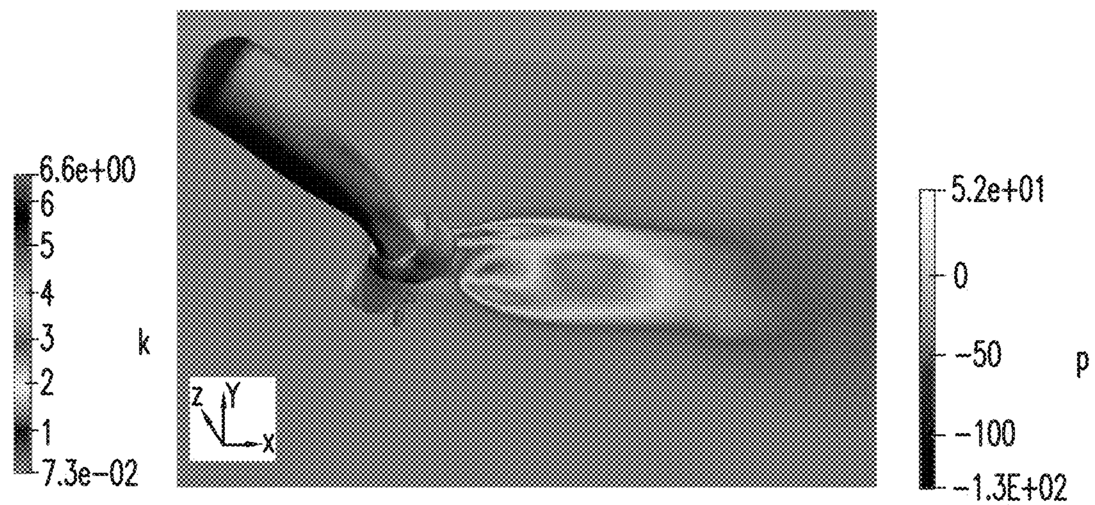
FIG. 20 shows a computational fluid dynamics simulation of a shoe that does not include a projection portion.

FIGS. 19 and 20 show computational fluid dynamics simulations that are similar to those in FIGS. 15 and 16, just from a different perspective, and showing kinetic energy. In particular, FIGS. 19 and 20 show one shoe (like the one in FIG. 1) that includes a projection portion (FIG. 19), and a different shoe (without a projection portion) (FIG. 20), both in a toe down configuration, moving and experiencing a resulting apparent wind. The condition (e.g., the speed of the apparent wind) in both simulations is identical. From these simulations, it can be seen that the FIG. 20 (no projection portion) shoe in the upper image shows a lot more kinetic energy imparted to the air, thus creating more drag.

Figure 21:
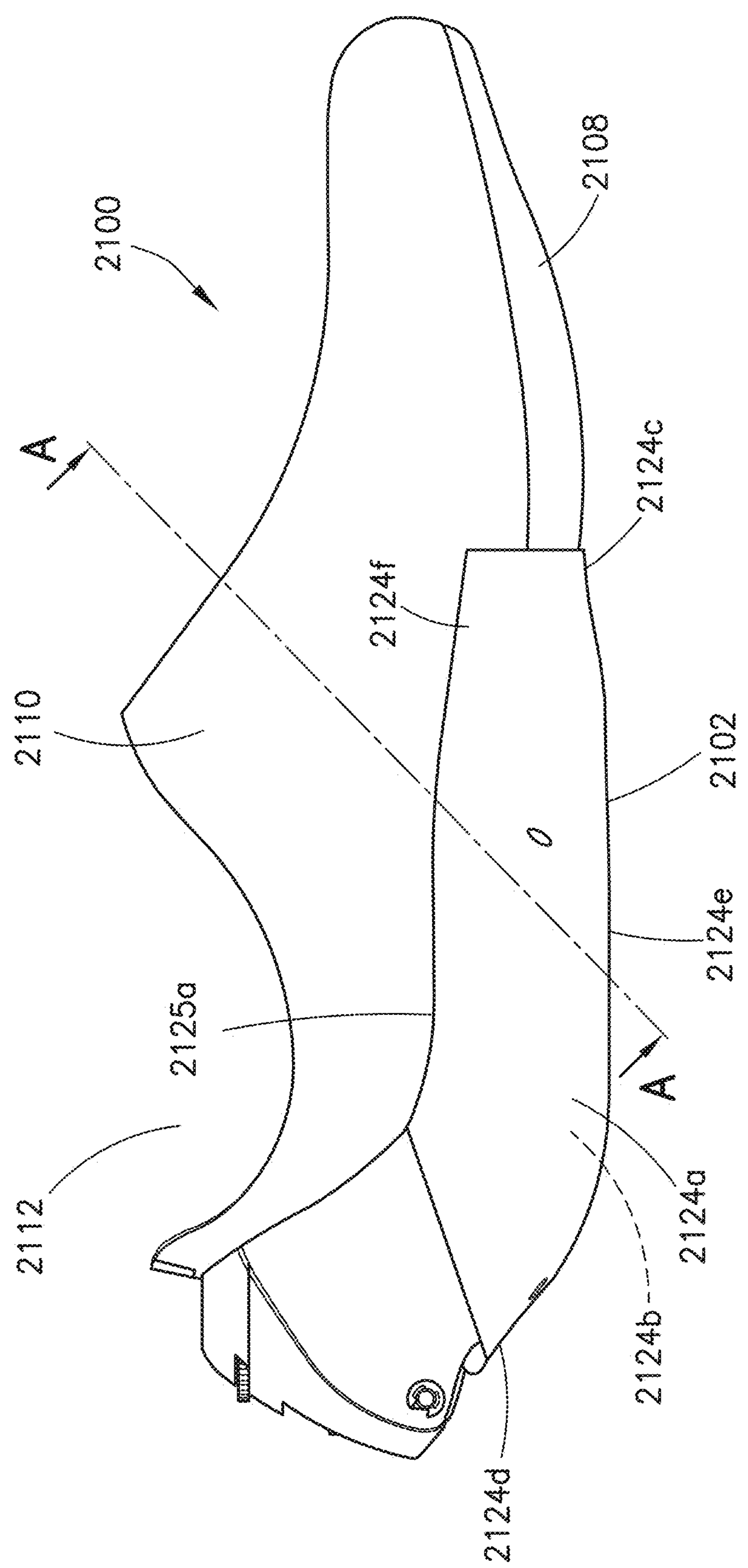
FIG. 21 is a right side view of yet another alternative implementation of a cycling shoe.
Figures 22, 23:
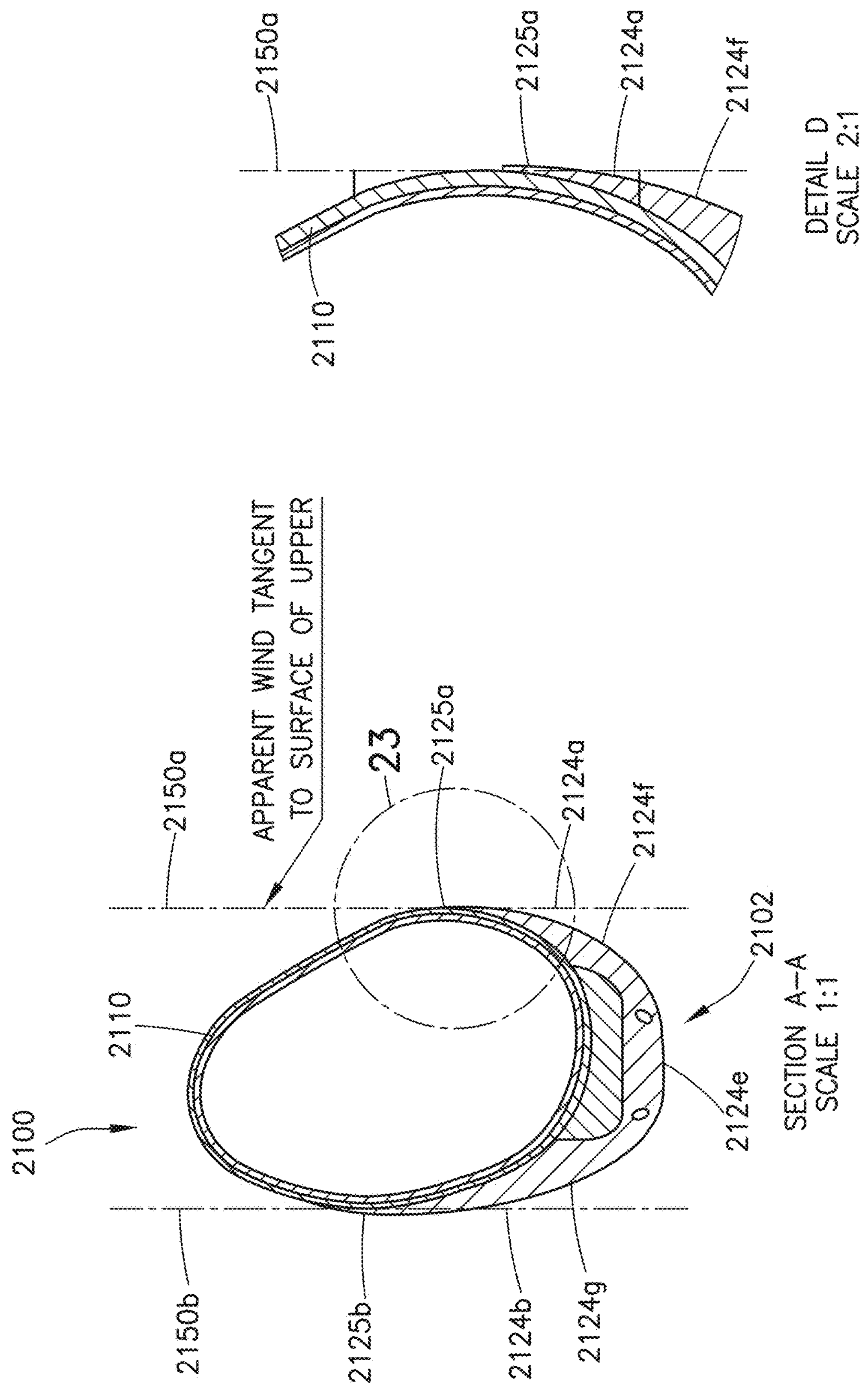
FIG. 22 is a cross-section of FIG. 21 (taken at line A-A).
FIG. 23 is a partial detail view of FIG. 22.

FIGS. 21-23 show an implementation of a cycling shoe 2100 that is similar to the cycling shoe 100 of FIG. 1.

In this regard, the cycling shoe 2100 has a sole 2108 and an upper 2110 attached to the sole 2108. Collectively, the sole 2108 and the upper 2110 define an interior foot compartment for receiving the foot of a cyclist. The upper 2110 also defines an opening 2112 in the top portion of the cycling shoe 2100 into a foot compartment. During use, a cyclist can slide his or her foot through the opening 2112 and into the foot compartment to put the shoe on. The cycling shoe 2100 may have a closure mechanism similar to those disclosed elsewhere herein.

The cycling shoe 2100 has a projection portion 2102 on a bottom thereof that contributes to the shoe's overall aerodynamic nature. More particularly, in the illustrated implementation, the projection portion 2102 has surfaces that roughly define a first lateral side surface 2124*a*, a second lateral side surface 2124*b* (at an opposite side of the cycling shoe 2100 from the first lateral side surface), a front side surface or edge 2124*c*, a rear side surface 2124*d*, and a bottom surface 2124*e*. The bottom surface 2124*e* extends between and connects the side surfaces, including the first lateral side surface 2124*a*, the second lateral side surface 2124*b*, the front side surface/edge 2124*c*, and the rear side surface 2124*d*. Curved or slightly rounded lateral edges 2124*f*, 2124*g* (see FIG. 22) provide a transition between the first and second lateral side surfaces 2124*a*, 2124*b* and the bottom surface 2124*e*. These curved or slightly rounded lateral edges 2124*f*, 2124*g* give the shoe 2100 a highly aerodynamic profile, particularly when the shoe 2100 is on a pedal in a toe-down configuration (i.e., with the toes pointed down toward the ground).

The lateral side surfaces 2124*a*, 2124*b* of the projection portion 2102 in shoe 2100 extend up the sides of the shoe 2100 such that the upper edges 2125*a*, 2125*b* of the lateral side surfaces 2124*a*, 2124*b* reach points on the shoe 2100 substantially where the surface of the upper 2110 (or shoe 2100) is tangent to a direction of apparent wind if the shoe is clipped into a cleat of a bicycle pedal in a 55 degree (or thereabout) toe-down (riding) configuration and moving in a forward direction. This can be seen, for example, in FIG. 22, which includes lines 2150*a*, 2150*b* that identify the apparent wind direction (top to bottom), and that show the upper edges 2125*a*, 2125*b* of the lateral side surfaces 2124*a*, 2124*b* reaching where the side surfaces of the upper 2110 are tangent to the direction of apparent wind. FIG. 23 illustrates the same phenomenon in finer detail on one side of the shoe 2100.

In a typical implementation, the upper edges 2125*a*, 2125*b* of the lateral side surfaces 2124*a*, 2124*b* reach points on the shoe 2100 where the surface of the upper 2110 (or shoe 2100) is tangent to a direction of apparent wind (as indicated above) at more than just a point or two. In fact, in a typical implementation, a significant portion (e.g., greater than 50%, 60%, 70% or 80% front to back) of each upper edge 2125*a*, 2125*b* extends up the sides of the shoe to the point of apparent wind tangency.

Moreover, in a typical implementation, the lateral side surfaces 2124*a*, 2124*b* of the projection portion taper toward their respective upper edges 2125*a*, 2125*b* so that the cross-sectional profile is substantially smooth as the shoe transitions from the upper 2110 to the projection portion 2102 at the upper edges 2125*a*, 2125*b*. Thus, apparent wind, passing the shoe, particularly in a toe-down configuration, flows relatively smoothly past the transition between upper 2110 and projection portion 2102.

In FIG. 22, it can be seen that the upper edge 2125*b* of one lateral side surface 2124*b* extends higher on the shoe than the upper edge 2125*a* of the other lateral side surface 2124*a*. This is because, due to the shape of the shoe and its cross-sectional profile when clipped into a pedal, the point on the upper 2100 that is tangent to the apparent wind is higher on upper edge 2125*b* side of the shoe 2100 than on the upper edge 2125*a* side of the shoe 2100.

The figures show the upper edges 2125*a*, 2125*b* of the lateral side surfaces 2124*a*, 2124*b* reaching exactly to where the surface of the upper 2110 is tangent to a direction of apparent wind. However, in some implementations, the upper edges 2125*a*, 2125*b* of the lateral side surfaces 2124*a*, 2124*b* reach only substantially to where the surface of the upper 2110 is tangent to a direction of apparent wind. Even reaching only substantially to that point can provide some advantages as well. For example, in some implementations, an upper edge could be as far past the point of tangency (past meaning in the direction of airflow) as to be 5 millimeters away from the tangent line or as far ahead of the point of tangency as to be 3.5 millimeters away from the tangent line.

Likewise, the figures show both upper edges 2125*a*, 2125*b*, on both lateral side surfaces 2124*a*, 2124*b* reaching to where the surface of the upper 2110 is tangent to a direction of apparent wind. However, in some implementations, only one of the upper edges (e.g., 2125*a* or 2125*b*) of one of the lateral side surfaces (2124*a* or 2124*b*) reaches the point of apparent wind tangency, whereas the other upper edge might be higher or lower than the point of apparent wind tangency on the other side of the shoe. In those implementations, some advantages can be achieved as well.

Figure 24:
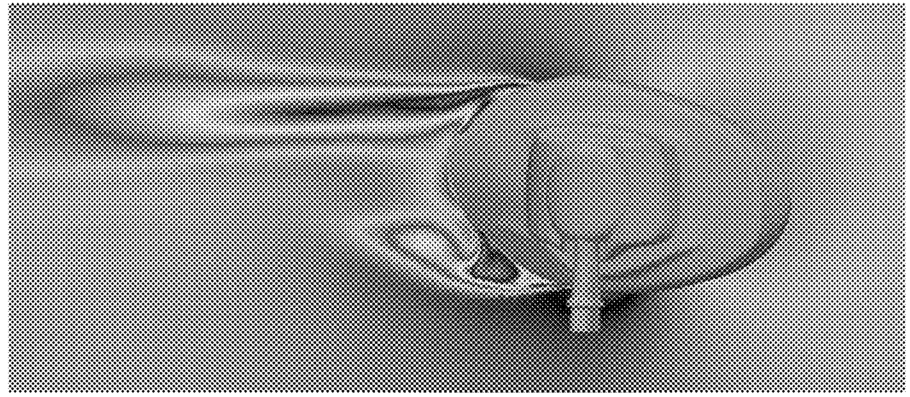
FIGS. 24 and 25 show visualizations from computational fluid dynamics (CFD) simulations of air velocity around different shoe designs.
Figure 25:
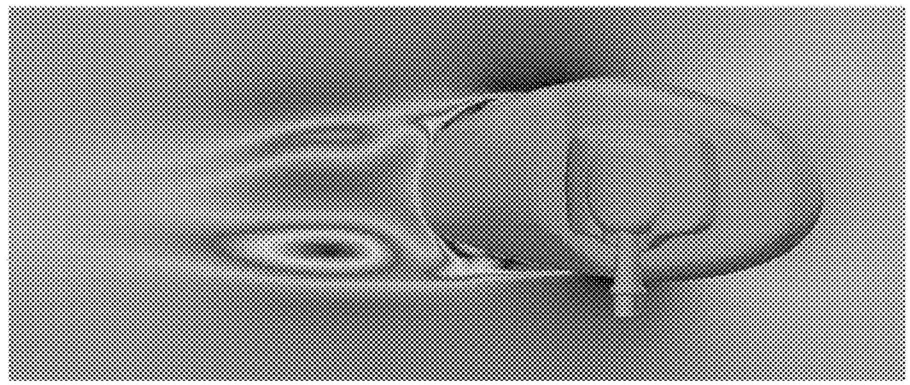

FIGS. 24 and 25 show visualizations from computational fluid dynamics (CFD) simulations of air velocity around different shoe designs: a standard shoe design (FIG. 24), and a shoe design more like the one in FIGS. 21-23 (FIG. 25). Both are looking up at the bottom of the shoe while it is in a 40 degree toe-down position. The point at which the velocity of the air dramatically slows (darker areas) and pulls away from the surface of the shoe in FIG. 24 is where air separation is happening, which is what the configurations in FIGS. 21-23 and 25 can help reduce or delay. It can be seen that the darker areas in contact with the surface of the shoe are much larger and more dramatic on the standard shoe (FIG. 24) than on the FIG. 21-23 shoe (FIG. 25). Without wrapping the "heel projection" at least very close up to where this separation happens, the separation cannot be reduced or delayed.

A number of embodiments of the invention have been described. Nevertheless, it will be understood that various modifications may be made without departing from the spirit and scope of the invention.

For example, the size, shape, and configuration, relative and absolute, of the various cycling shoe components can vary considerably. A variety of materials can be used to form the cycling shoe and/or its various components.

There are a variety of ways that the cable (or cables) may be routed through or around the cycling shoe. For example, in some implementations, the cycling shoe may be fit with two cables: one extending from a first one of the cable connectors to the lever assembly, and another extending from the other of the cable connectors to the lever assembly. The routing of the cable (or cables) through the shoe can include one or more passages that are not expressly disclosed herein. These passage(s) may be through the sole of the shoe, the upper, the projection, and/or any other portions of the shoe.

The configuration of the lever assembly can vary. For example, the cable carriage can be virtually any kind of physical component (e.g., an anchor, or the like) whose position within the lever assembly can be adjusted, and to whom a cable can be connected. The tension adjuster can be virtually any kind of mechanism that enables a user to adjust the position of the cable carriage. The tension adjuster may be lockable in its final, adjusted position. The guides for the cable carriage and the manner in which the cable carriage engages the guides can vary. For example, the guides may be recesses and the cable carriage may include projections that extend into and that can slide along the recesses.

The cable connectors can be any kind of physical structure, to which the cable(s) can be attached. In fact, in some implementations, the cable connectors may be a simple eyelet hole in the closure panel (or in a piece of fabric attached to the closure panel) that may be reinforced with a metal or plastic grommet, for example. The cable connectors can be attached to the closure panel in any number of a variety of possible ways, or can be integrally formed with the closure panel. Moreover, some implementations may include only one cable connector (at one lateral side of the closure panel), where the opposite side of the closure panel is securely connected to the upper.

Any number of strips of material may be provided to urge the closure panel away from the upper. In this regard, some shoes may have only one such strip of material, some may have two strips of material (one on each side of the shoe, or two on one side of the shoe), some may have more than two strips of material, and the strips of material may be configured in any number of possible ways.

The extension 115 is typically a separate, rigid piece of material that is attached to (e.g., via adhesive or some other connection technique) to a rear part of the upper. In some implementations, the extension can be integrally formed with the upper. The extension can have any one of a variety of possible shapes or sizes. The shape and size disclosed in the figures and described herein generally contributes to the overall aerodynamic nature of the shoe.

The projection portion is described herein in portions of this application as a portion of the sole of the shoe. The protection portion may, in some implementations, be integrally formed with the sole, or may, in some implementations, separately formed, but attached to the sole.

The phrase "toe down configuration," and the like are used herein. Generally speaking, this phrase refers to any configuration in which the toe of the shoe is pointing in a downward direction (e.g., toward the surface on which the cyclist is riding). This can include, of course, configurations where the angle created by the intersection of the direction of the front of the shoe and the surface being ridden on is greater than about 45 degrees (e.g., about 55 degrees as shown in FIGS. 9 and 10).

In some implementations, each lateral side surface of the projection portion extends from a bottom surface of the sole flush with (or very close to flush with) a corresponding lateral side surface of the sole. As used herein, the phrase very close to flush can include an offset of up to about ⅛ of an inch. So, in a typical implementation, the lateral side surface of the sole and the lateral side surface of the projection portion are flush or have an offset of no more than about ⅛ of an inch. Likewise, in a typical implementation, the lateral side surface of the sole is flush with (or, again, very close to flush with) a corresponding lateral side surface of the upper. In some implementations, the projection portion is integral with the sole (i.e., formed as a single structure with the sole and not separable from the sole without destroying the projection portion, the sole, or both).

In a typical implementation, the projection portion has a rear surface that slopes gently upward from the bottom surface of the projection portion to a rear of the sole/upper. In a typical implementation, the rear surface of the projection portion, too, is flush with (or very close to flush with) a corresponding rear surface of the sole and/or upper.

In some implementations, the lateral side surfaces are substantially flat. In some implementations, however, each lateral side surface is curved so as to form, together with its corresponding rounded lateral edge, a single, continuous curved or rounded surface that extends from the sole of the shoe to the bottom surface of the projection portion. In some implementations, the bottom surface of the projection portion can be similarly curved.

A variety of terminology is used herein to describe relative positions and orientations. This terminology, including for example "up", "down", "forward", "rearward", "top", "bottom," etc., is solely for the purposes of clarity and is not intended to limit the scope of what is described here or to require particular positions and/or orientations. Accordingly, such relative terminology should not be construed to limit the scope of the present application. Additionally, the term substantially, and similar words, such as substantial, are used herein. Unless otherwise indicated, substantially, and similar words, should be construed broadly to mean completely and almost completely.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other implementations are within the scope of the claims.

What is claimed is:

1. A cycling shoe comprising:
- a sole and an upper coupled to the sole;
- a projection portion that extends off a bottom surface of the sole behind a cleat portion of the sole,
- wherein the projection portion comprises:
  - a first lateral side surface;
  - a second lateral side surface at an opposite side of the cycling shoe from the first lateral side surface;
  - a bottom surface; and
  - rounded lateral edges that connect each of the first and second lateral side surfaces to the bottom surface;
- an adjustable closure panel that extends across an opening in the upper; and
- a lever assembly exposed at an outer, rear surface of the upper, wherein the lever assembly is movable about a hinge between a first position and a second position; and
- one or more passages through the projection portion to accommodate one or more cables for connecting the lever assembly to the adjustable closure panel.

2. The cycling shoe of claim 1, wherein each of the rounded lateral edges has a radius of at least 7 mm.

3. The cycling shoe of claim 1, further comprising a means for attaching a cycling cleat to sole in the cleat portion of the sole.

4. The cycling shoe of claim 1, further comprising:
- a cycling cleat attached to the cleat portion of the sole,
- wherein the projection portion further comprises a front side surface that faces the cycling cleat, and
- a space between the front surface of the projection portion and the cycling cleat.

5. The cycling shoe of claim 1, whether the projection portion is integral with the sole.

6. The cycling shoe of claim 1 wherein the lever assembly is configured such that moving the lever assembly between the first position and the second position causes the one or more cables, if connected between the lever assembly to the adjustable closure panel, to tighten or loosen the closure panel relative to the upper.

7. The cycling shoe of claim 1, wherein each lateral side surface of the projection portion extends from a bottom surface of the sole flush with or very close to flush with a corresponding lateral side surface of the sole.

8. The cycling shoe of claim 7, wherein each lateral side surface of the sole is flush with or very close to flush with a corresponding lateral side surface of the upper.

9. The cycling shoe of claim 1, wherein the projection portion comprises a rear surface that slopes upward from the bottom surface of the projection portion to a rear of the sole or upper,
- wherein the rear surface of the projection portion is flush with or very close to flush with a corresponding rear surface of the sole and/or upper.

10. The cycling shoe of claim 1, wherein a furthest point of a trailing edge of the shoe in a 55-degree toe-down position is between 14 millimeters and 47 millimeters from the sole, or from where the sole would be if the projection portion were not present.

11. The cycling shoe of claim 10, wherein the furthest point of the trailing edge of the shoe in the 55-degree toe-down position is between 17 millimeters and 37 millimeters from the sole, or from where the sole would be if the projection portion were not present.

12. The cycling shoe of claim 1, wherein the first or second lateral side surfaces of the projection portion extend up sides of the shoe to where the surface of the upper is tangent to a direction of apparent wind if the shoe is clipped into a cleat of a bicycle in a toe down configuration and moving in a forward direction.

13. The cycling shoe of claim 12, wherein the first and second lateral side surfaces of the projection portion extend up sides of the shoe to where the surface of the upper is tangent to a direction of apparent wind if the shoe is clipped into a cleat of a bicycle in a toe down configuration and moving in a forward direction.

* * * * *